United States Patent
Little et al.

(10) Patent No.: US 8,571,221 B2
(45) Date of Patent: Oct. 29, 2013

(54) ON-CHIP STORAGE, CREATION, AND MANIPULATION OF AN ENCRYPTION KEY

(75) Inventors: Herbert A. Little, Waterloo (CA);
Jerrold R. Randell, Waterloo (CA);
Richard C. Madter, Puslinch (CA);
Ryan J. Hickey, Waterloo (CA);
Andrew A. Fergusson, St. Clements (CA)

(73) Assignee: BlackBerry Limited, Waterloo (CA)

( * ) Notice: Subject to any disclaimer, the term of this patent is extended or adjusted under 35 U.S.C. 154(b) by 1568 days.

(21) Appl. No.: 11/051,560

(22) Filed: Feb. 4, 2005

(65) Prior Publication Data
US 2005/0232415 A1      Oct. 20, 2005

Related U.S. Application Data

(60) Provisional application No. 60/541,972, filed on Feb. 5, 2004.

(51) Int. Cl.
*H04L 9/00*      (2006.01)

(52) U.S. Cl.
USPC ............ 380/264; 380/28; 380/44; 380/255; 380/262; 380/281; 380/284; 711/163; 711/164; 713/171; 713/190

(58) Field of Classification Search
USPC ............ 380/262, 281, 284, 264, 28, 44, 255; 711/163, 164; 713/171, 190
See application file for complete search history.

(56) References Cited

U.S. PATENT DOCUMENTS 4,058,673 A * 11/1977 Johansson ..................... 380/264
5,058,164 A    10/1991 Elmer et al.
5,537,642 A * 7/1996 Glowny et al. ................. 726/2
5,692,049 A * 11/1997 Johnson et al. ............. 713/189
5,987,572 A    11/1999 Weidner et al.
6,131,090 A    10/2000 Basso, Jr. et al.

(Continued)

FOREIGN PATENT DOCUMENTS

| EP | 0148960 A1 | 7/1985 |
| JP | 2003-304237 A | 10/2003 |
| JP | 2004-023122 A | 1/2004 |

OTHER PUBLICATIONS http://patentscope.wipo.int/search/en/detail.jsf?docId=WO2005076515&recNum=1&tab=NationalPhase&maxRec=&office=&prev Filter=&sortOption=&queryString=; WIPO; 2009.*

(Continued)

*Primary Examiner* — April Y Blair
(74) *Attorney, Agent, or Firm* — Jenna L. Wilson; Dimock Stratton LLP

(57) ABSTRACT

A system and method of creating and managing encryption keys in a data processing device generates subsequent encryption keys by combining the existing encryption key with an existing password and seed value. In the preferred embodiment, the initial encryption key is embedded during manufacture and is unknown to the user and manufacturer, thus ensuring that all subsequent encryption keys are derived from an unknown value. When a subsequent encryption key is generated, all data encrypted using the existing encryption key is decrypted using the existing encryption key and re-encrypted using the subsequent encryption key before the existing encryption key is overwritten. In a further aspect, during encryption/decryption the encryption key is combined with the sector address of the data to be encrypted/decrypted in order to generate a unique key for each sector of data to be encrypted/decrypted.

16 Claims, 28 Drawing Sheets

(56) References Cited

U.S. PATENT DOCUMENTS

| | | |
|---|---|---|
| 6,345,359 B1 | 2/2002 | Bianco |
| 6,526,144 B2* | 2/2003 | Markandey et al. ............ 380/28 |
| 6,574,732 B1* | 6/2003 | Steinberg et al. ............ 713/193 |
| 7,010,590 B1* | 3/2006 | Munshi ........................ 709/224 |
| 7,079,653 B2* | 7/2006 | Scheidt et al. ................ 380/258 |
| 7,086,087 B1* | 8/2006 | Kaminaga et al. ............ 726/16 |
| 7,171,566 B2* | 1/2007 | Durrant ........................ 713/189 |
| 7,269,259 B1* | 9/2007 | Fernandez .................... 380/264 |
| 7,272,228 B2* | 9/2007 | Atkin et al. ................... 380/264 |
| 7,386,713 B2* | 6/2008 | Madter et al. ..................... 713/2 |
| 7,451,288 B2* | 11/2008 | Goettfert et al. ............. 711/164 |
| 7,454,017 B2* | 11/2008 | Kaminaga et al. ............ 380/46 |
| 2002/0073326 A1 | 6/2002 | Fontijn |
| 2002/0094086 A1 | 7/2002 | Grassmann et al. |
| 2002/0124177 A1 | 9/2002 | Harper et al. |
| 2003/0039358 A1* | 2/2003 | Scheidt et al. ................. 380/47 |
| 2003/0140239 A1 | 7/2003 | Kuroiwa et al. |
| 2003/0204732 A1* | 10/2003 | Audebert et al. ............. 713/182 |
| 2003/0236983 A1 | 12/2003 | Mihm, Jr. |
| 2004/0146163 A1 | 7/2004 | Asokan et al. |
| 2005/0108498 A1* | 5/2005 | Kaminaga et al. ............ 711/209 |
| 2005/0108576 A1* | 5/2005 | Munshi ........................ 713/201 |
| 2005/0108700 A1* | 5/2005 | Chen et al. ................... 717/168 |
| 2005/0157874 A1* | 7/2005 | Bresson et al. ................ 380/30 |
| 2006/0265563 A1* | 11/2006 | Goettfert et al. ............. 711/164 |
| 2007/0140495 A1* | 6/2007 | Berzanskis et al. ........... 380/278 |
| 2007/0192592 A1* | 8/2007 | Goettfert et al. ............. 713/162 |
| 2008/0066168 A1* | 3/2008 | Gregg et al. ...................... 726/7 |

OTHER PUBLICATIONS

Extended European Patent Search dated Dec. 28, 2009 issued in EP 09164148.0.

* cited by examiner

| Address Offset (1) MCU_ADDR[7:0] | NAME | Contents |
|---|---|---|
| 0x00 | AES_PLAIN | Plaintext Register Field |
| 0x10 | AES_CIPHER | Ciphertext Register Field |
| 0x20 | AES_KEY_PM | Key Peripheral Register Field |
| 0x30 | AES_MANUAL | Manual Launch Register |
| 0x32 | AES_STATUS | Status Register |
| 0x34 | AES_CR | Control Register |

NOTES:
(1) This Address Offset is added to the AES base address (AES_BASE) as define by the MIC in Table 5.2-29.

FIG. 5

AES Plaintext Register FieldBase Address:see Figure 5

AES_PLAIN

| MCU_ADDR OFFSET | REG Mnemonic | REG Bits (D[15:0]) | Reset State |
|---|---|---|---|
| 0xE | AES_PLAIN7 | AES_PLAIN[127:112] | 0x0000 |
| 0xC | AES_PLAIN6 | AES_PLAIN[111:96] | 0x0000 |
| 0xA | AES_PLAIN5 | AES_PLAIN[95:80] | 0x0000 |
| 0x8 | AES_PLAIN4 | AES_PLAIN[79:64] | 0x0000 |
| 0x6 | AES_PLAIN3 | AES_PLAIN[63:48] | 0x0000 |
| 0x4 | AES_PLAIN2 | AES_PLAIN[47:32] | 0x0000 |
| 0x2 | AES_PLAIN1 | AES_PLAIN[31:16] | 0x0000 |
| 0x0 | AES_PLAIN0 | AES_PLAIN[15:0] | 0x0000 |

| Bit Mnemonic | Function |
|---|---|
| AES_PLAIN[127:0] | Plain Text Register |

FIG. 6

AES Ciphertext Register Field     Base Address:   see Figure 5

AES_CIPHER

| MCU_ADDR OFFSET | REG Mnemonic | REG Bits (D[15:0]) | Reset State |
|---|---|---|---|
| 0xE | AES_CIPHER7 | AES_CIPHER[127:112] | 0x0000 |
| 0xC | AES_CIPHER6 | AES_CIPHER[111:96] | 0x0000 |
| 0xA | AES_CIPHER5 | AES_CIPHER[95:80] | 0x0000 |
| 0x8 | AES_CIPHER4 | AES_CIPHER[79:64] | 0x0000 |
| 0x6 | AES_CIPHER3 | AES_CIPHER[63:48] | 0x0000 |
| 0x4 | AES_CIPHER2 | AES_CIPHER[47:32] | 0x0000 |
| 0x2 | AES_CIPHER1 | AES_CIPHER[31:16] | 0x0000 |
| 0x0 | AES_CIPHER0 | AES_CIPHER[15:0] | 0x0000 |

| Bit Mnemonic | Function |
|---|---|
| AES_CIPHER[127:0] | Cipher Text Register |

FIG. 7

AES Key Peripheral Register Field     Base Address:   see Figure 5

AES_KEY_PM

| MCU_ADDR OFFSET | REG Mnemonic | REG Bits (D[15:0]) | Reset State |
|---|---|---|---|
| 0xE | AES_KEY_PM7 | AES_KEY_PM[127:112] | 0x0000 |
| 0xC | AES_KEY_PM6 | AES_KEY_PM[111:96] | 0x0000 |
| 0xA | AES_KEY_PM5 | AES_KEY_PM[95:80] | 0x0000 |
| 0x8 | AES_KEY_PM4 | AES_KEY_PM[79:64] | 0x0000 |
| 0x6 | AES_KEY_PM3 | AES_KEY_PM[63:48] | 0x0000 |
| 0x4 | AES_KEY_PM2 | AES_KEY_PM[47:32] | 0x0000 |
| 0x2 | AES_KEY_PM1 | AES_KEY_PM[31:16] | 0x0000 |
| 0xE | AES_KEY_PM0 | AES_KEY_PM[15:0] | 0x0000 |

| Bit Mnemonic | Function |
|---|---|
| AES_KEY_PM[127:0] | Key Peripheral Register |

FIG. 8

| AES Manual Register | | Address: | see Figure 5 |
| --- | --- | --- | --- |
| | | Reset State: | 0x0000 |
| AES_MANUAL | | Access: | 16 bit |
| Read/Write | | | |

| 15 | 14 | 13 | 12 | 11 | 10 | 9 | 8 |
| --- | --- | --- | --- | --- | --- | --- | --- |
| N/A | | | | | | | |

| 7 | 6 | 5 | 4 | 3 | 2 | 1 | 0 |
| --- | --- | --- | --- | --- | --- | --- | --- |
| N/A | | | | | | | |

| Bit # | Bit Mnemonic | Function |
| --- | --- | --- |
| 15:0 | NA | (R) '0000 0000 0000 0000'<br>(W) Any write to this register launches a peripheral operation when in manual mode. Manual mode is configured in AES_CR. |

FIG. 9

| AES Status Register | | Address: | see Figure 5 |
| --- | --- | --- | --- |
| | | Reset State: | 0x0000 |
| AES_STATUS | | Access: | 16 bit |
| Read | | | |

| 15 | 14 | 13 | 12 | 11 | 10 | 9 | 8 |
| --- | --- | --- | --- | --- | --- | --- | --- |
| N/A | | | | | | | |

| 7 | 6 | 5 | 4 | 3 | 2 | 1 | 0 |
| --- | --- | --- | --- | --- | --- | --- | --- |
| N/A | | | | | PERI_DONE | PERI_UNDER WAY | LAUNCH_PERI_PENDING |

| Bit # | Bit Mnemonic | Function |
| --- | --- | --- |
| 15:3 | NA | (RO) '0000 0000 0000 0' |
| 2 | PERI_DONE | '0' – The peripheral operation is in progress<br>'1' – The peripheral operation is complete |
| 1 | PERI_UNDERWAY | '0' – The peripheral operation is not in progress<br>'1' – The peripheral operation is in progress |
| 0 | LAUNCH_PERI_PENDING | '0' – A peripheral operation will not launch after datapath operation in progress.<br>'1' – A peripheral operation will launch after datapath operation in progress. |

FIG. 10

| AES Control Register | | Address: | see Figure 5 |
| --- | --- | --- | --- |
| | | Reset State: | 0x0000 |
| AES_CR | | Access: | 16 bit |
| Read/Write | | | |

| 15 | 14 | 13 | 12 | 11 | 10 | 9 | 8 |
| --- | --- | --- | --- | --- | --- | --- | --- |
| N/A | | | | | | | |

| 7 | 6 | 5 | 4 | 3 | 2 | 1 | 0 |
| --- | --- | --- | --- | --- | --- | --- | --- |
| N/A | | | | PERI_EN | D_NOT_E | LE_NOT_BE | MANUAL |

| Bit # | Bit Mnemonic | Function |
| --- | --- | --- |
| 15:4 | NA | (RO) '0000 0000 0000' |
| 3 | PERI_EN | '0' – AES controls gated clock.<br>'1' – Gated clock is enabled. |
| 2 | D_NOT_E | Peripheral mode direction<br>'0' – decryption<br>'1' – encryption |
| 1 | LE_NOT_BE | Peripheral mode data format<br>'0' – ???????<br>'1' – little endian halfword |
| 0 | MANUAL | Launch mode<br>'0' – auto peripheral operation launch mode<br>'1' – manual launch mode. Writing anything to AES_MANUAL launches a peripheral operation. |

FIG. 11 e# = encryption, d#=decryption, k#=key expansion, rf=register file handoff

| Address Offset (1) MCU_ADDR[5:0] | NAME | Contents |
|---|---|---|
| 0x00 | SEC-CTRL | Control Register |
| 0x02 | SEC-STAT | Status Register |
| 0x10 | SEC-VER_CTRL | Version Control Register |
| 0x20 | SEC-PW | Password Register Field |
| 0x30 | SEC-KS | Key Seed Register Field |

NOTES:
(1) This Address Offset is added to the SEC base address (SEC_BASE) as define by the MIC in Table 5.2-29.

FIG. 15

| SEC Control Register | Address: | see Figure 15 |
|---|---|---|
| | Reset State: | 0x0000 |
| SEC-CTRL | Access: | 16 bit |
| Read/Write | | |

| 15 | 14 | 13 | 12 | 11 | 10 | 9 | 8 |
|---|---|---|---|---|---|---|---|
| | | | N/A | | | | |

| 7 | 6 | 5 | 4 | 3 | 2 | 1 | 0 |
|---|---|---|---|---|---|---|---|
| FAST_IF | CLEAR_SDRAM | DIS_ENCRYPT | KEY_SELECT[1:0] | | CMD[2:0] | | |

| Bit # | Bit Mnemonic | Function |
|---|---|---|
| 15:8 | N/A | (RO) '0000 0000' |
| 7 | FAST_IF | Fast Interface (R/W)<br>0: Normal (EEPROM clock speed = sys_clk/1024)<br>1: Fast (EEPROM clock speed = sys_clk/8)<br>Fast mode is provided for debug/test purposes only. EEPROM operation is not characterized at this speed. |
| 6 | CLEAR_SDRAM | Clear SDRAM (R/W)<br>0: CLEAR_SDRAM signal to SIC is controlled by state machine.<br>1: CLEAR_SDRAM signal to SIC is asserted. |
| 5 | DIS_ENCRYPT | Disable Encryption (R/W*)<br>0: Encryption and decryption is performed as per the current state.<br>1: Encryption and decryption is bypassed.<br>This bit is only writeable when accessed from the processor interface. |
| 4:3 | KEY_SELECT[1:0] | Key Select (R/W)<br>00 : Password and Key set 0<br>01 : Password and Key set 1<br>10 : Password and Key set 2<br>11 : Password and Key set 3 |
| 2:0 | CMD[2:0] | Key Command (R/W)<br>000: GET_KEY<br>001: COMPARE<br>010: ADD_KEY<br>011: REMOVE_KEY<br>100: CHANGE_KEY<br>101: UPDATE_KEY<br>110: ENTER_DEBUG<br>111: EXIT_DEBUG |

FIG. 16A

| Bit # | Bit Mnemonic | Function |
|---|---|---|
| 3:0 | MODE[3:0] | Key Mode (RO)<br>0000 : Insecure<br>0001 : Clear_SDRAM<br>0010 : Insecure_Debug<br>0011 : Get_Key<br>0100 : Key_Loaded<br>0101 : Compare_Keys<br>0110 : Add_Key<br>0111 : Remove_Key<br>1000 : Change_Key<br>1001 : Update_Key<br>1010 : Secure<br>1011 : Compare_Keys2<br>1100 : Validate<br>1101 : Secure_Debug<br>1110 : not valid<br>1111 : not valid |

FIG. 16B

| SEC Status Register | | Address: | see Figure 15 |
|---|---|---|---|
| | | Reset State: | 0x0000 |
| SEC-STAT | | Access: | 16 bit |
| Read/Write | | | |

| 15 | 14 | 13 | 12 | 11 | 10 | 9 | 8 |
|---|---|---|---|---|---|---|---|
| CMD_BUSY | EEPROM_BUSY | EEPROM_ERROR | N/A | | | | SDRAM_CLEAR |

| 7 | 6 | 5 | 4 | 3 | 2 | 1 | 0 |
|---|---|---|---|---|---|---|---|
| KEY_STAT[1:0] | | PW_STAT[1:0] | | MODE[3:0] | | | |

| Bit # | Bit Mnemonic | Function |
|---|---|---|
| 15 | CMD_BUSY | Command Busy (RO)<br>0: not busy<br>1: busy<br>This bit will be cleared when the current command has completed. |
| 14 | EEPROM_BUSY | EEPROM Busy (RO)<br>0: not busy<br>1: busy, EEPROM device address was not acknowledged during GET_KEY<br>This bit will be cleared upon writing to this register. |
| 13 | EEPROM_ERROR | EEPROM Error (RO)<br>0: no error<br>1: error, EEPROM word address, or write data was not acknowledged or device address was not acknowledged after a 15 ms timeout.<br>This bit will be cleared upon writing to this register. |
| 12:9 | N/A | (RO) '0 000' |
| 8 | SDRAM_CLEAR | SDRAM_CLEAR (RO)<br>0: SDRAM_CLEARED was not asserted.<br>1: SDRAM_CLEARED was asserted.<br>This bit will be cleared upon writing to this register. |
| 7:6 | KEY_STAT | Key Compare Status (RO)<br>00: no result<br>01: Key Match<br>10: Key Mismatch, or no old key had been loaded<br>11: Comparison being made |
| 5:4 | PW_STAT | Password Compare Status (RO)<br>00: no result, password cleared<br>01: Password Valid<br>10: Password Invalid<br>11: Comparison being made |

FIG. 17A

| Bit # | Bit Mnemonic | Function |
|---|---|---|
| 3:0 | MODE[3:0] | Key Mode (RO)<br>0000 : Insecure<br>0001 : Clear_SDRAM<br>0010 : Insecure_Debug<br>0011 : Get_Key<br>0100 : Key_Loaded<br>0101 : Compare_Keys<br>0110 : Add_Key<br>0111 : Remove_Key<br>1000 : Change_Key<br>1001 : Update_Key<br>1010 : Secure<br>1011 : Compare_Keys2<br>1100 : Validate<br>1101 : Secure_Debug<br>1110 : not valid<br>1111 : not valid |

FIG. 17B

| SEC Version Control Register | | | | | Address: | see Figure 15 | |
|---|---|---|---|---|---|---|---|
| SEC-VER_CTRL | | | | | Reset State: | 0x0FFF | |
| Read Only | | | | | Access : | 16 bit | |
| 15 | 14 | 13 | 12 | 11 | 10 | 9 | 8 |
| VER[3:0] | | | | REV[11:8] | | | |
| 7 | 6 | 5 | 4 | 3 | 2 | 1 | 0 |
| REV[7:0] | | | | | | | |

| Bit # | Bit Mnemonic | Function |
|---|---|---|
| 15:12 | VER[3:0] | Version (RO)<br><br>VER is a unique value that increments from 0-15 for every change in the design that affects more than just the metal layer.<br><br>i.e. a new gate level netlist would include the VER[3:0] being incremented.<br><br>VER[3:0] is also visible in the JTAG ID scan register. |
| 11:0 | REV[11:0] | Revision (RO)<br><br>REV[11:0] identifies 11 unique changes at each VERSION level.<br>Bits in REV are incrementally grounded for each revision in the metal layer according to the scheme below.<br><br>REV[9:0] = 1111 1111 1111 = REV not registered (see note note 1)<br>REV[9:0] = 1111 1111 1110 = 1<br>REV[9:0] = 1111 1111 1100 = 2<br>...<br>REV[9:0] = 0000 0000 0000 = 11 |

NOTES:
1) A configuration bus write to any address must be performed before REV[11:0] is updated with valid data.

FIG. 18

SEC Password Register Field                     Base Address:   see Figure 15

SEC-PW

| MCU_ADDR OFFSET | REG Mnemonic | REG Bits (D[15:0]) | Reset State |
|---|---|---|---|
| 0xE | SEC-PW7 | PW[127:112] | 0x0000 |
| 0xC | SEC-PW6 | PW[111:96] | 0x0000 |
| 0xA | SEC-PW5 | PW[95:80] | 0x0000 |
| 0x8 | SEC-PW4 | PW[79:64] | 0x0000 |
| 0x6 | SEC-PW3 | PW[63:48] | 0x0000 |
| 0x4 | SEC-PW2 | PW[47:32] | 0x0000 |
| 0x2 | SEC-PW1 | PW[31:16] | 0x0000 |
| 0x0 | SEC-PW0 | PW[15:0] | 0x0000 |

| Bit Mnemonic | Function |
|---|---|
| PW[127:0] | Password (W only)<br><br>This field contains the password that is used for comparision purposes, and for the password that is linked with a new encryption keys.<br><br>The full password must be entered while in Key_Loaded, Secure, or the Validate states in order to execute the ADD_KEY, REMOVE_KEY, CHANGE_KEY, or COMPARE commands. Otherwise, transition from those states is prohibited. |

FIG. 19

SEC Key Seed Register Field          Base Address:    see Figure 15

SEC-KS

| MCU_ ADDR OFFSET | REG Mnemonic | REG Bits (D[15:0]) | Reset State |
|---|---|---|---|
| 0xE | SEC-KS7 | KS[127:112] | 0x0000 |
| 0xC | SEC-KS6 | KS[111:96] | 0x0000 |
| 0xA | SEC-KS5 | KS[95:80] | 0x0000 |
| 0x8 | SEC-KS4 | KS[79:64] | 0x0000 |
| 0x6 | SEC-KS3 | KS[63:48] | 0x0000 |
| 0x4 | SEC-KS2 | KS[47:32] | 0x0000 |
| 0x2 | SEC-KS1 | KS[31:16] | 0x0000 |
| 0x0 | SEC-KS0 | KS[15:0] | 0x0000 |

| Bit Mnemonic | Function |
|---|---|
| KS[127:0] | Key Seed (W only)<br>This field contains the key seed which XOR with the current key and current password to obtain a new key. |

FIG. 20

ON-CHIP STORAGE, CREATION, AND MANIPULATION OF AN ENCRYPTION KEY

REFERENCE TO PRIOR APPLICATIONS

This application claims priority from U.S. Application No. 60/541,972, filed Feb. 5, 2004.

BACKGROUND

1. Technical Field

This invention relates to data processing systems. In particular, this invention relates to a data security system using on-chip secure key storage, which is particularly suitable for use in portable data processing devices.

2. Description of Related Art

The use of portable data processing systems has increased significantly in recent years. In addition to so called "laptop" and "tablet" computers, there is a growing popularity in handheld data processing devices, often called a "personal digital assistant" or "PDA." All of these devices are capable of storing a significant amount of user data, including calendar, address book, tasks and numerous other types of data for business and personal use. Most handheld data processing devices have the ability to connect to a personal computer for data exchange, and many are equipped for wireless communications using, for example, conventional email messaging systems. Depending upon the user's needs much of this data can be highly sensitive in nature, especially for example in a government, military or commercial context.

Portable data processing systems are typically password protected, which is sufficient to protect the information against attack by ordinary individuals. However, if the device were to fall into the hands of a technically sophisticated individual with malicious intent, there are ways to obtain the data stored in memory in such a device. For example, if the data is not encrypted, a technically skilled individual can remove the memory chip and extract the data directly from the chip.

If the data is encrypted, it can only be compromised if the attacker has access to the encryption key. In a software-based encryption system, the encryption key is accessible to a technically sophisticated individual who has unlimited access to the device. Furthermore, software-based encryption systems are often cumbersome, and as such degrade processing speed and overall system performance.

It is accordingly desirable to provide a hardware-based encryption system that encrypts and decrypts data in real time, without markedly reducing the operating speed of the device or markedly increasing energy consumption.

SUMMARY

In accordance with one embodiment, there is provided a method of encryption key management comprising decrypting data encrypted using a first encryption key and stored in a memory device, the first encryption key being calculated using a current key and an entirety of a memory address of the encrypted data to be decrypted; generating a new key from the current key, a stored password, and a key seed value; re-encrypting, using a second encryption key, the data thus decrypted, the second encryption key being derived from the new key and an entirety of a memory address where the re-encrypted data is to be stored; storing the re-encrypted data in the memory device at said memory address where the re-encrypted data is to be stored; and overwriting the current key with the new key. There is also provided a memory controller interface configured to manage encryption keys, the memory controller interface comprising a password register configured to store a password; a current key register configured to store a current key; a key seed input configured to incorporate a key seed value from a random key seed generator; a key generation block configured to generate a new key from the password, the current key, and the key seed value; wherein the key generation block is further configured to calculate a first encryption key using the current key and an entirety of a memory address of encrypted data to be decrypted using the first encryption key; and wherein the key generation block is further configured to calculate a second encryption key using the new key and an entirety of a memory address where data decrypted using the first encryption key and re-encrypted with the second encryption key is to be stored; and an encryption/decryption module configured to carry out decryption and encryption of data.

In accordance with another embodiment, a method for encrypting data stored in a memory is provided, comprising the steps of: identifying the address in memory of the data to be encrypted; retrieving an encryption key; generating at least one unique key derived from the encryption key and the address of the data; and encrypting the data using the at least one unique key. In a further aspect of the invention, the address in memory of the data is the sector address and the unique key is derived by XOR-ing the bits of the sector address with the encryption key, and the step of encrypting the data may be accomplished using AES. In another embodiment of the invention, the method further comprises the steps of receiving a request to decrypt encrypted data stored in the memory; generating at least one unique key derived from the encryption key and the address of the data; and decrypting the data using the at least one unique key.

Yet another aspect is a method for data stored in a memory, comprising the steps of: retrieving an encryption key; identifying the address in memory of a first portion of the data to be encrypted; deriving a first unique key from the encryption key and the address of the first portion of data; encrypting the first portion of data using the first unique key; identifying the address in memory of a second portion of data to be encrypted; deriving a second unique key from the encryption key and the address of the second portion of data; and encrypting the second portion of data using the second unique key. In a further aspect, the address in memory of the data is the sector address and the unique key is derived by XOR-ing the bits of the sector address with the encryption key. Yet another aspect is that the method further comprises the steps of receiving a request to decrypt encrypted data stored in the memory; identifying the address in memory of a first portion of the data to be decrypted; deriving a first decryption unique key from the encryption key and the address of the first portion of data; decrypting the first portion of data using the first decryption unique key; identifying the address in memory of a second portion of data to be decrypted; deriving a second decryption unique key from the encryption key and the address of the second portion of data; and decrypting the second portion of data using the second decryption unique key. In an embodiment, the steps of identifying the addresses of the first and second portions of data and deriving the first and second unique keys are carried out prior to encryption of any data. In a further embodiment, the steps of identifying the addresses of the first and second portions of data to be encrypted and deriving the first and second unique keys are carried out prior to encryption of any data, and the steps of identifying the addresses of the first and second portions of data to be decrypted and deriving the first and second decryption unique keys are carried out prior to decryption of any data. Still another aspect is that the decryption of the second portion of data is carried out prior to the decryption of the first portion of data.

Another aspect is a method for decrypting data stored in a memory, comprising the steps of identifying the address in memory of the data to be decrypted; retrieving an decryption key; generating at least one unique key derived from the decryption key and the address of the data; and decrypting the data using the at least one unique key. In a further aspect, the method comprises the steps of retrieving an decryption key; identifying the address in memory of a first portion of the data to be decrypted; deriving a first unique key from the decryption key and the address of the first portion of data; decrypting the first portion of data using the first unique key; identifying the address in memory of a second portion of data to be decrypted; deriving a second unique key from the decryption key and the address of the second portion of data; and decrypting the second portion of data using the second unique key. Preferably, each portion of data is a sector of data and each unique key is derived by XOR-ing the bits of the address with the encryption key.

Yet another aspect is password authorization, including the steps of receiving a request for access to encrypted data stored in the memory component and a password; comparing the received password with a predetermined password; and if the received password and the predetermined password match, permitting access to encrypted data and carrying out the unique key generation and decryption steps. In a further aspect, the method includes the steps of receiving a request for access to encrypted data stored in the memory component and a password; comparing the received password with a predetermined password; and if the received password and the predetermined password match, permitting access to encrypted data and carrying out the unique key derivation and decryption steps.

Yet a further aspect is that an encryption module for a computing device for encrypting data stored in a memory is provided, the encryption module being configured to: identify the address in memory of the data to be encrypted; retrieve an encryption key; generate at least one unique key derived from the encryption key and the address of the data; and encrypt the data using the at least one unique key. In another aspect, the encryption module is further configured to retrieve an encryption key; identify the address in memory of a first portion of the data to be encrypted; derive a first unique key from the encryption key and the address of the first portion of data; encrypt the first portion of data using the first unique key; identify the address in memory of a second portion of data to be encrypted; derive a second unique key from the encryption key and the address of the second portion of data; and encrypt the second portion of data using the second unique key. In still a further aspect, the encryption module is also configured to receive a request to decrypt encrypted data stored in the memory; identify the address in memory of a first portion of the data to be decrypted; derive a first decryption unique key from the encryption key and the address of the first portion of data; decrypt the first portion of data using the first decryption unique key; identify the address in memory of a second portion of data to be decrypted; derive a second decryption unique key from the encryption key and the address of the second portion of data; and decrypt the second portion of data using the second decryption unique key.

In a further aspect, the encryption module is also configured to identify the addresses of the first and second portions of data to be encrypted and derive the first and second unique keys are carried out prior to encryption of any data, and identify the addresses of the first and second portions of data to be decrypted and derive the first and second decryption unique keys are carried out prior to decryption of any data. The second portion of data is preferably decrypted prior to the decryption of the first portion of data, and preferably the address in memory of the data is the sector address and each unique key is derived by XOR-ing the bits of the sector address with the encryption or decryption key.

In a further aspect, a communications device is provided for carrying out the methods described above and comprising the encryption module described above.

BRIEF DESCRIPTION OF THE DRAWINGS

In drawings which illustrate by way of example only a preferred embodiment of the system.

FIG. 3, comprising segments 3A through 3I, is a detailed block diagram of the memory controller interface in the data processing device of FIG. 2, wherein

FIG. 5 is a Configuration Registers Map for the encryption module of FIG. 4.

FIG. 6 is an AES Plaintext Register Field table for the encryption module of FIG. 4.

FIG. 7 is an AES Ciphertext Register Field table for the encryption module of FIG. 4.

FIG. 8 is an AES Key Peripheral Register Field table for the encryption module of FIG. 4.

FIG. 9 is an AES Manual Register table for the encryption module of FIG. 4.

FIG. 10 is an AES Status Register table for the encryption module of FIG. 4.

FIG. 11 is an AES Control Register table for the encryption module of FIG. 4.

FIG. 15 is a Configuration Registers Map for the Serial EEPROM Controller of FIG. 13.

FIG. 16A and 16B are first and second parts of a Control Register table for the Serial EEPROM Controller of FIG. 13.

FIG. 17A and 17B are first and second parts of a Status Register table for the Serial EEPROM Controller of FIG. 13.

FIG. 18 is a Version Control Register table for the Serial EEPROM Controller of FIG. 13.

FIG. 19 is a Password Register Field table for the Serial EEPROM Controller of FIG. 13.

FIG. 20 is a Key Seed Register Field table for the Serial EEPROM Controller of FIG. 13.

DETAILED DESCRIPTION

Figure 1:
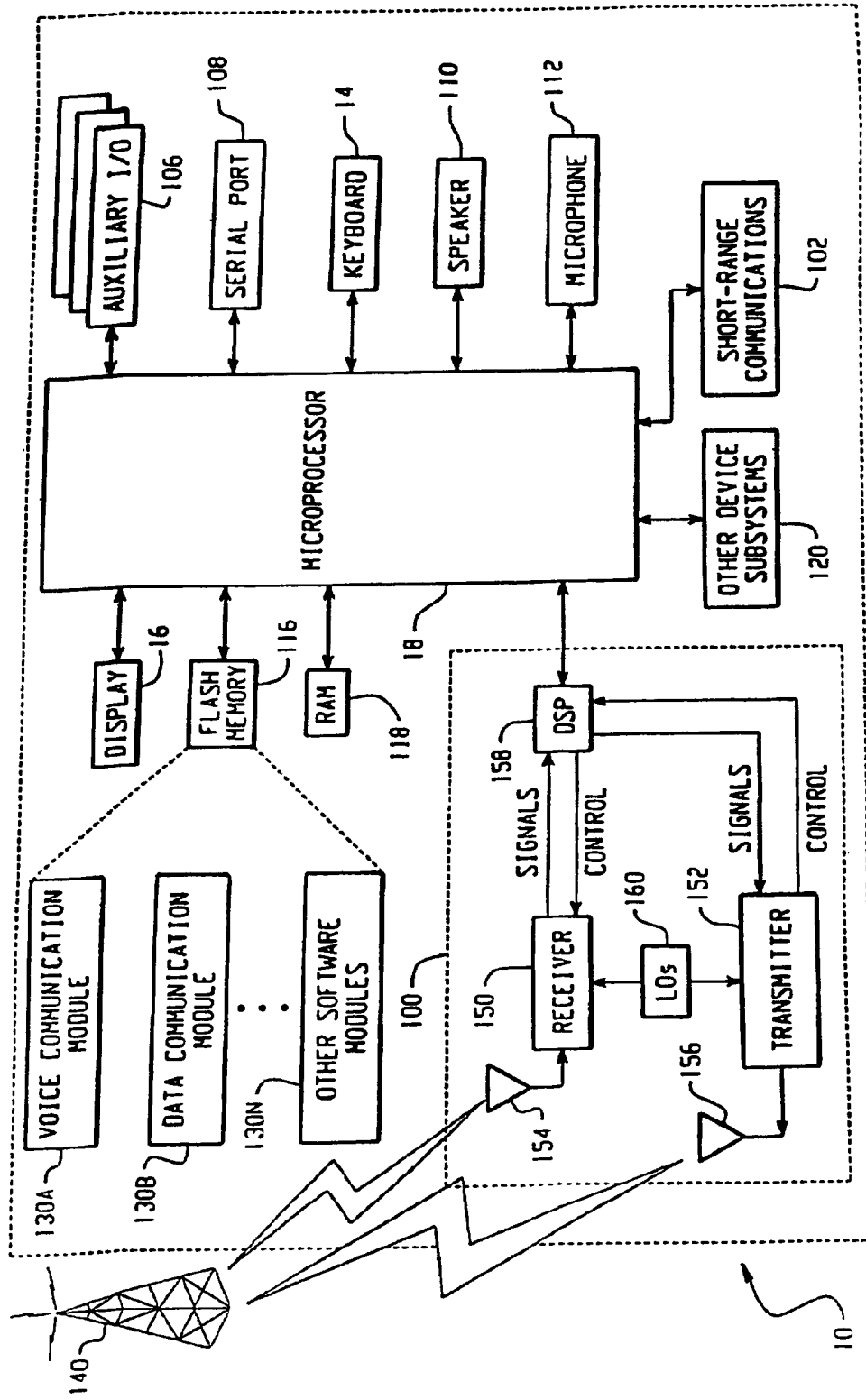
FIG. 1 is a block diagram of a system overview of a conventional hand-held data processing device.
Figure 2:
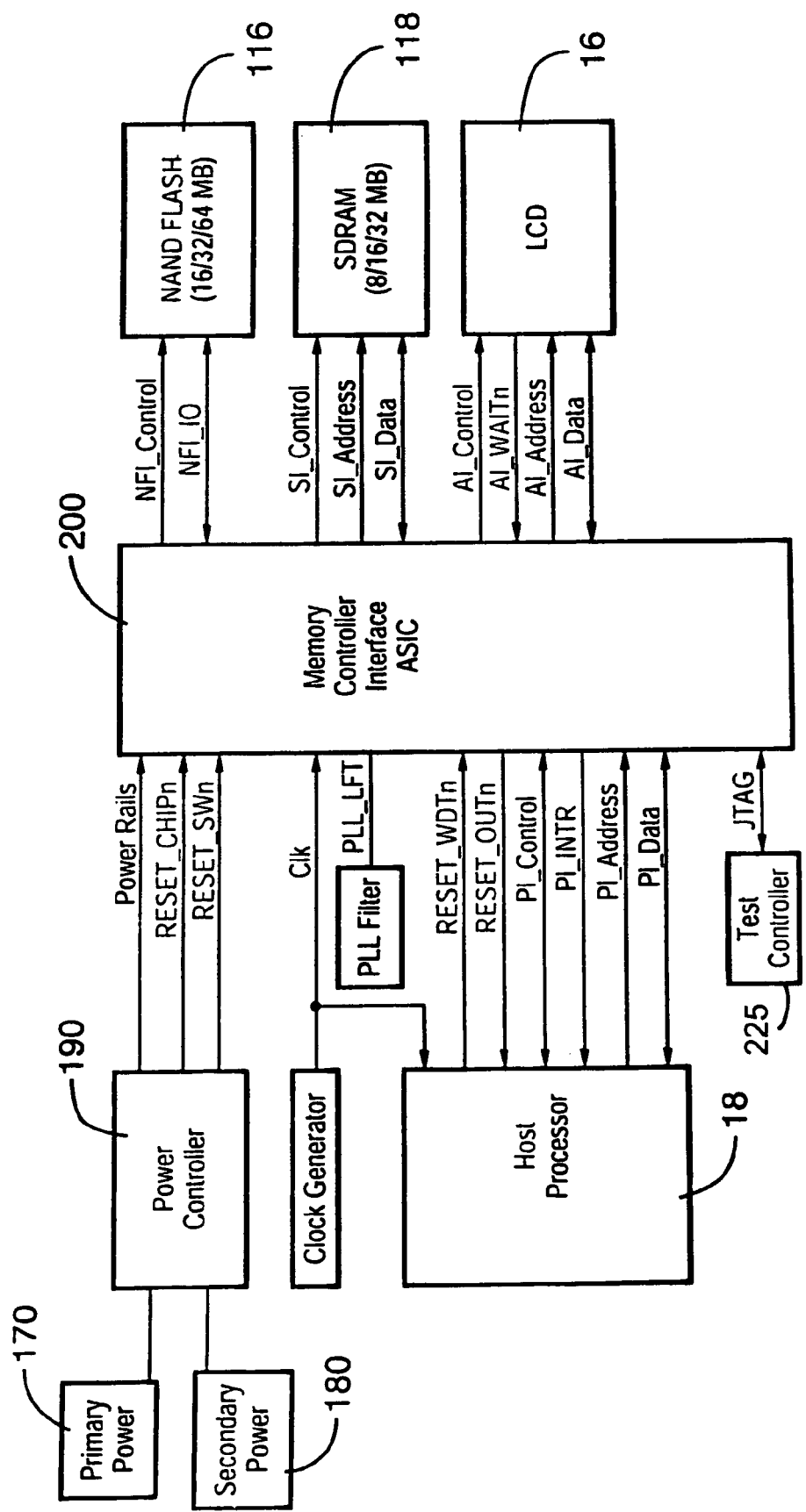
FIG. 2 is a system interface block diagram of a data processing device.
Figure 3A:
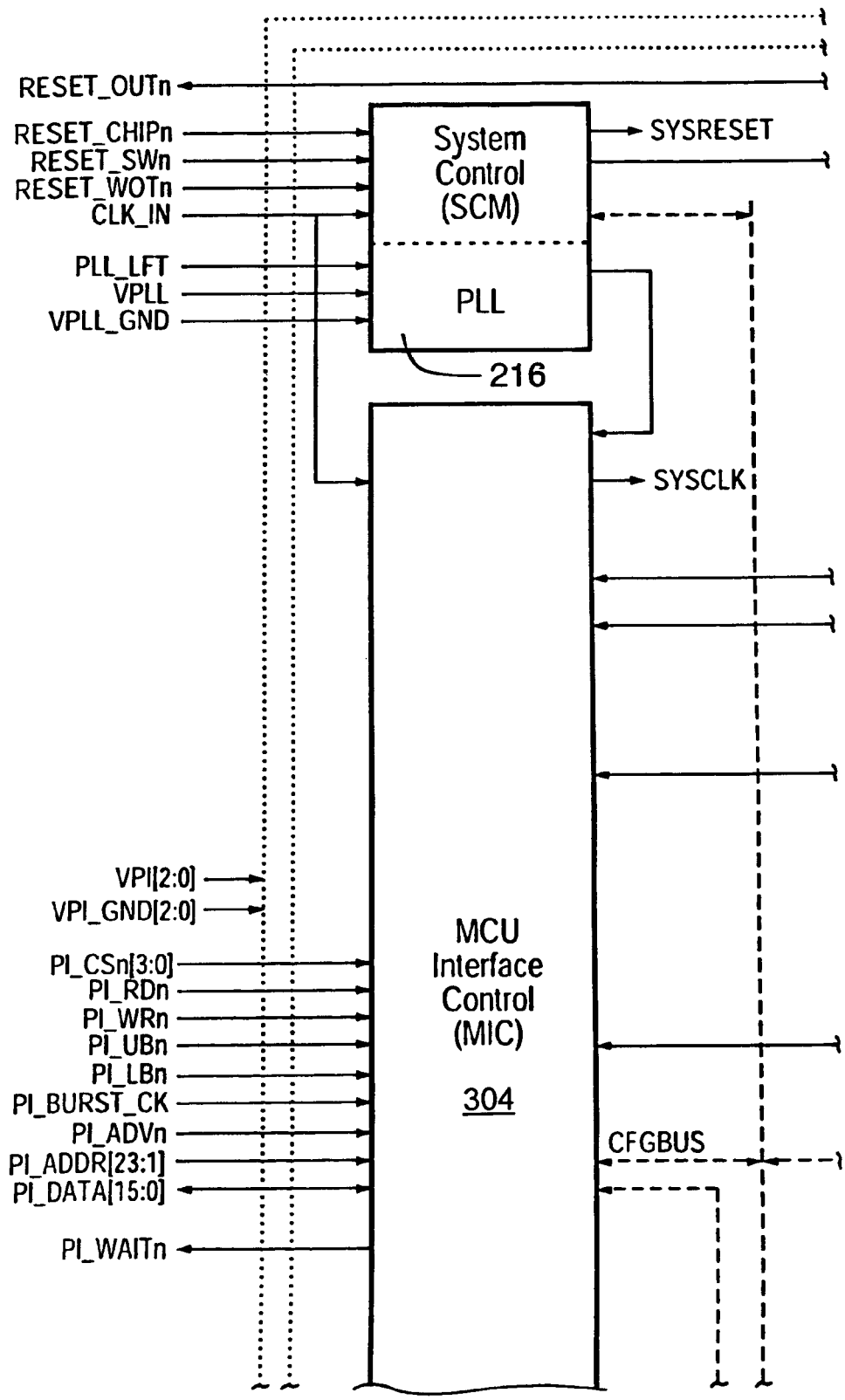
Figure 3B:
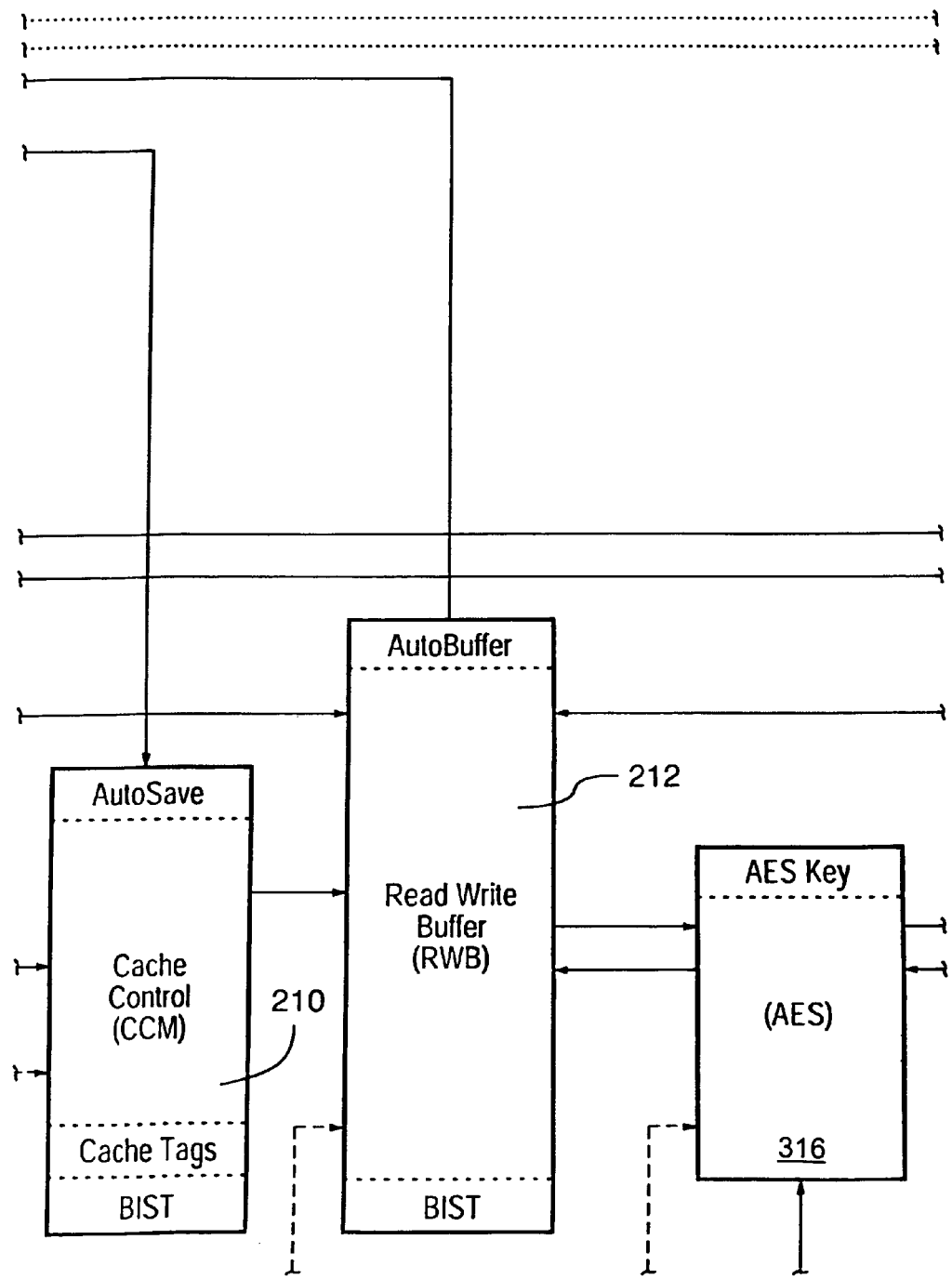
Figure 3C:
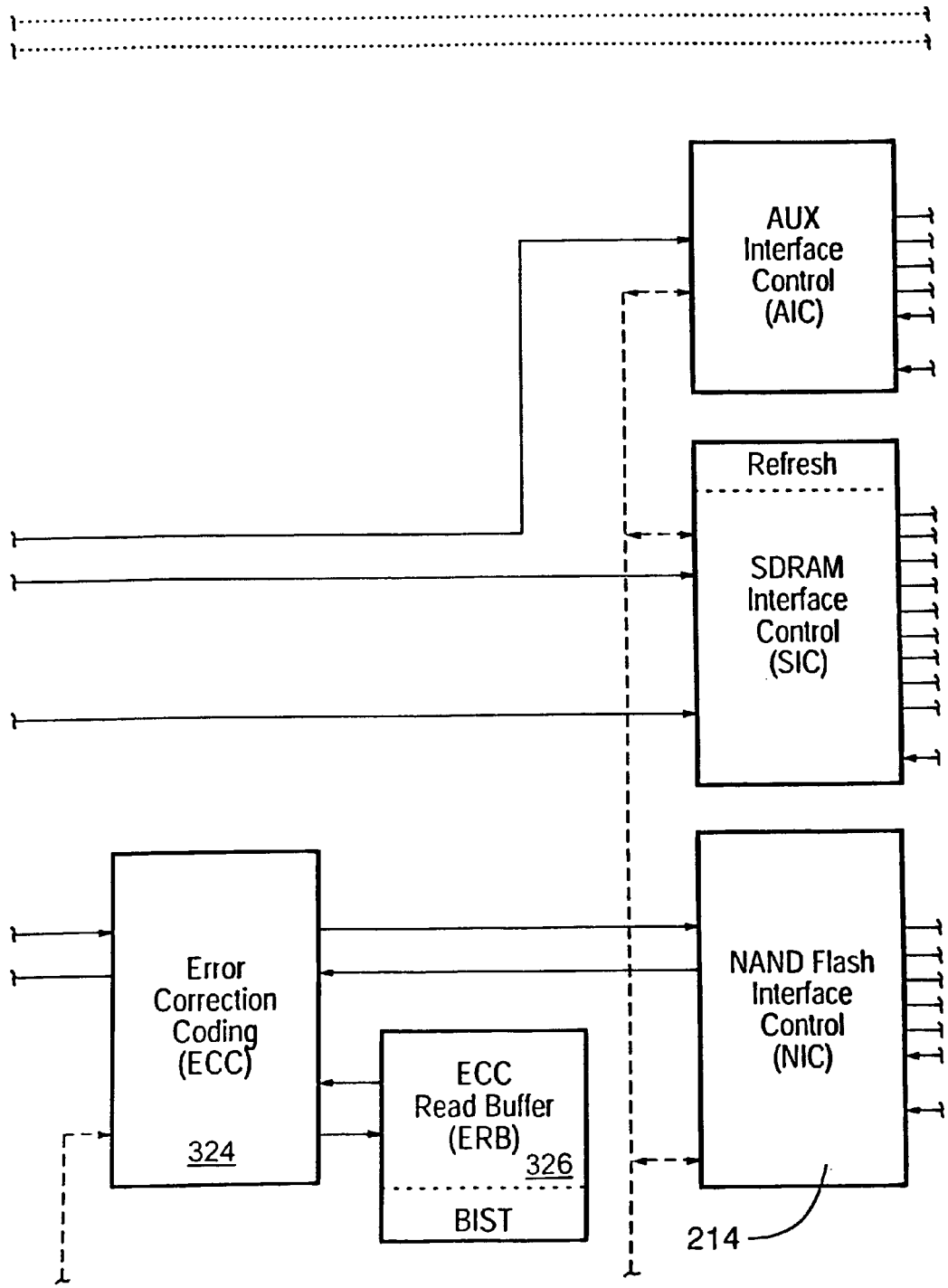
Figure 3D:
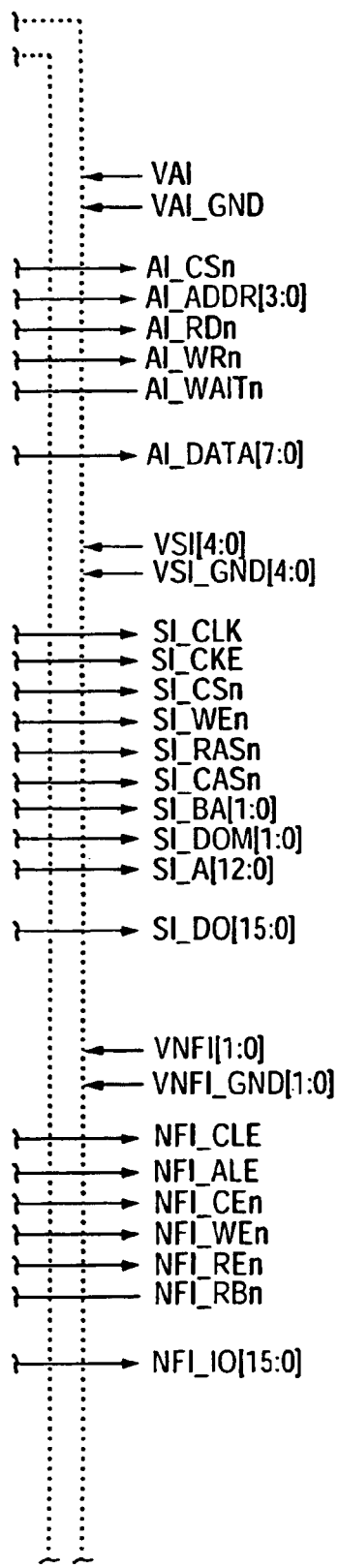
Figure 3E:
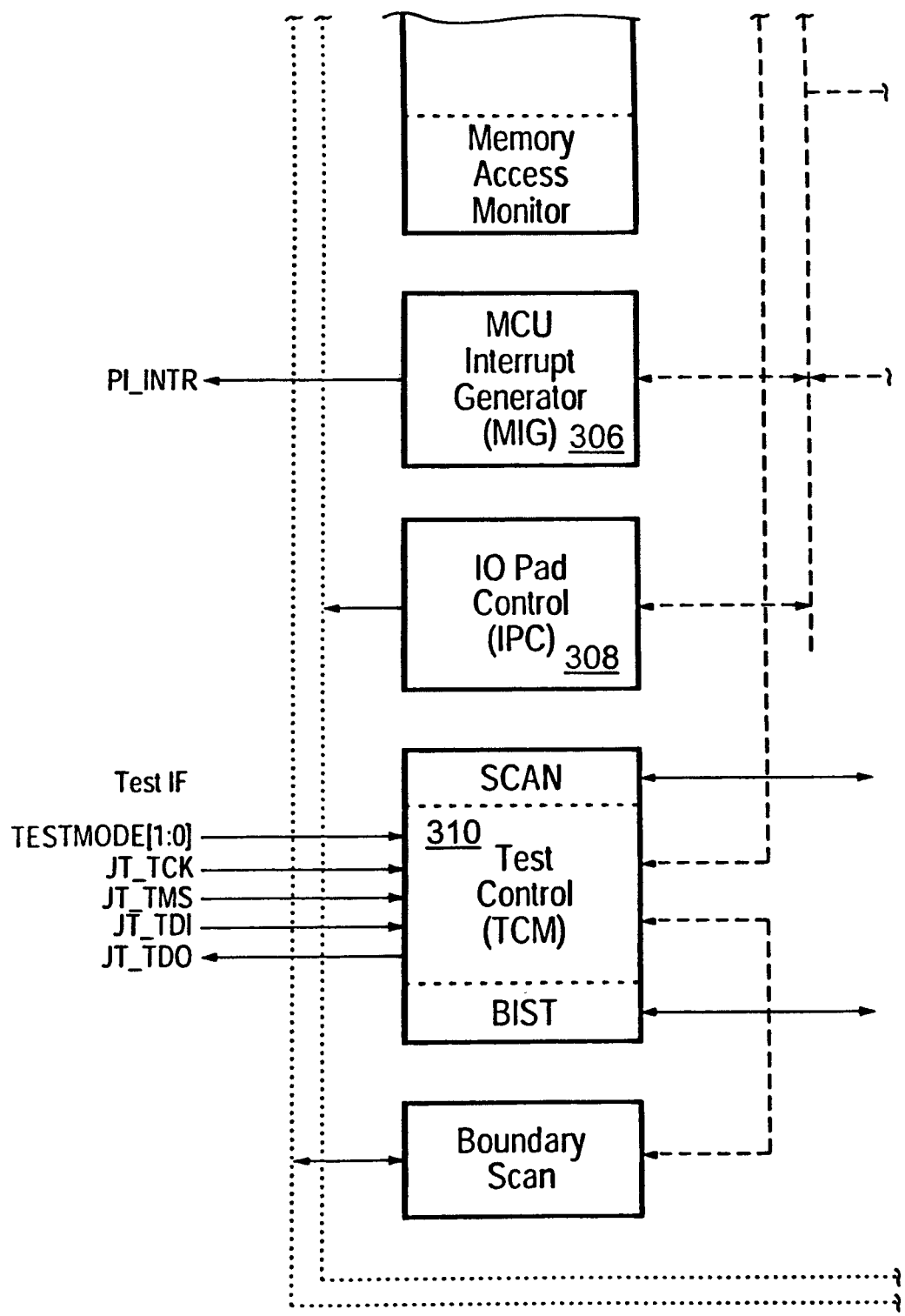
Figure 3F:
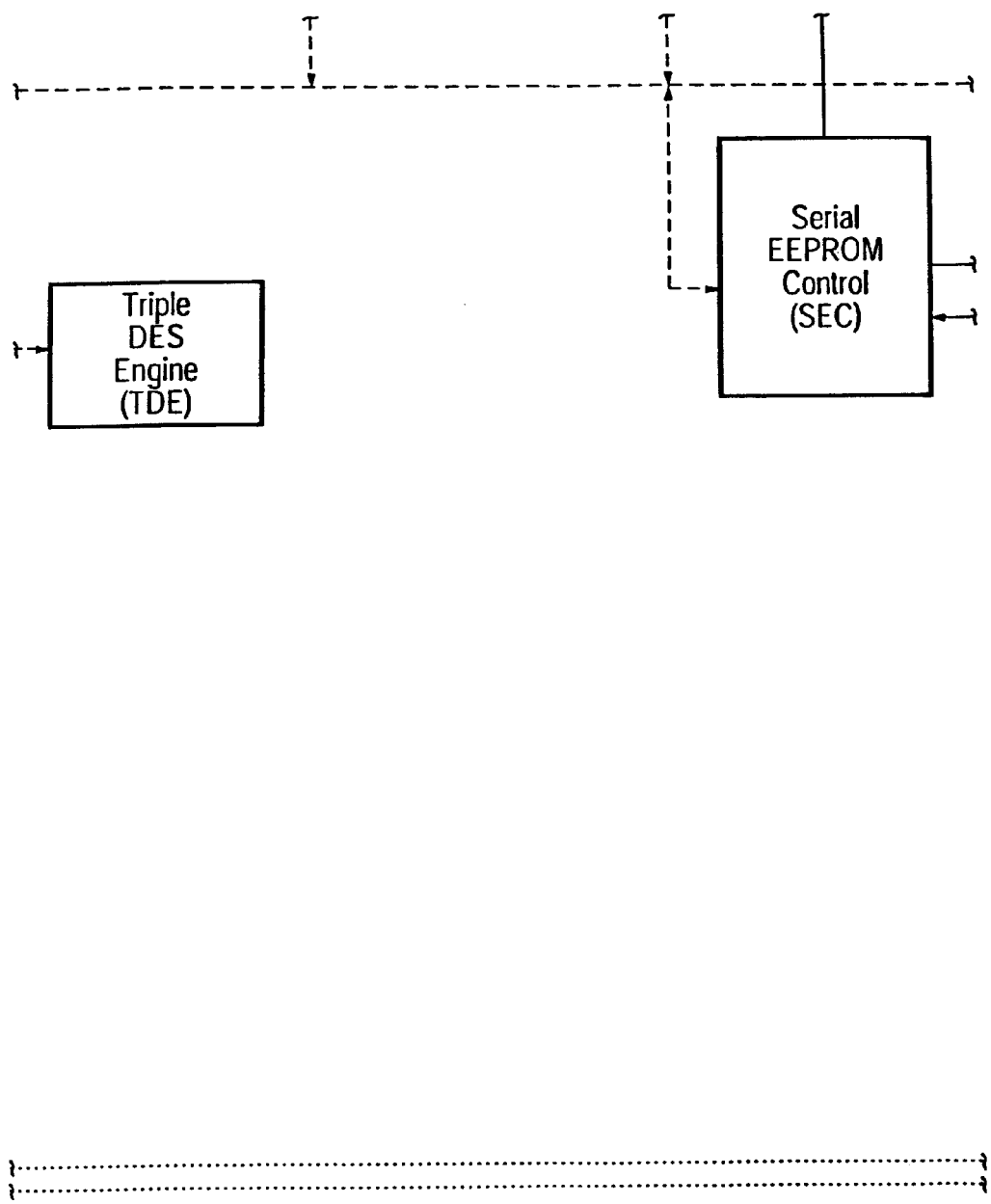
Figure 3G:
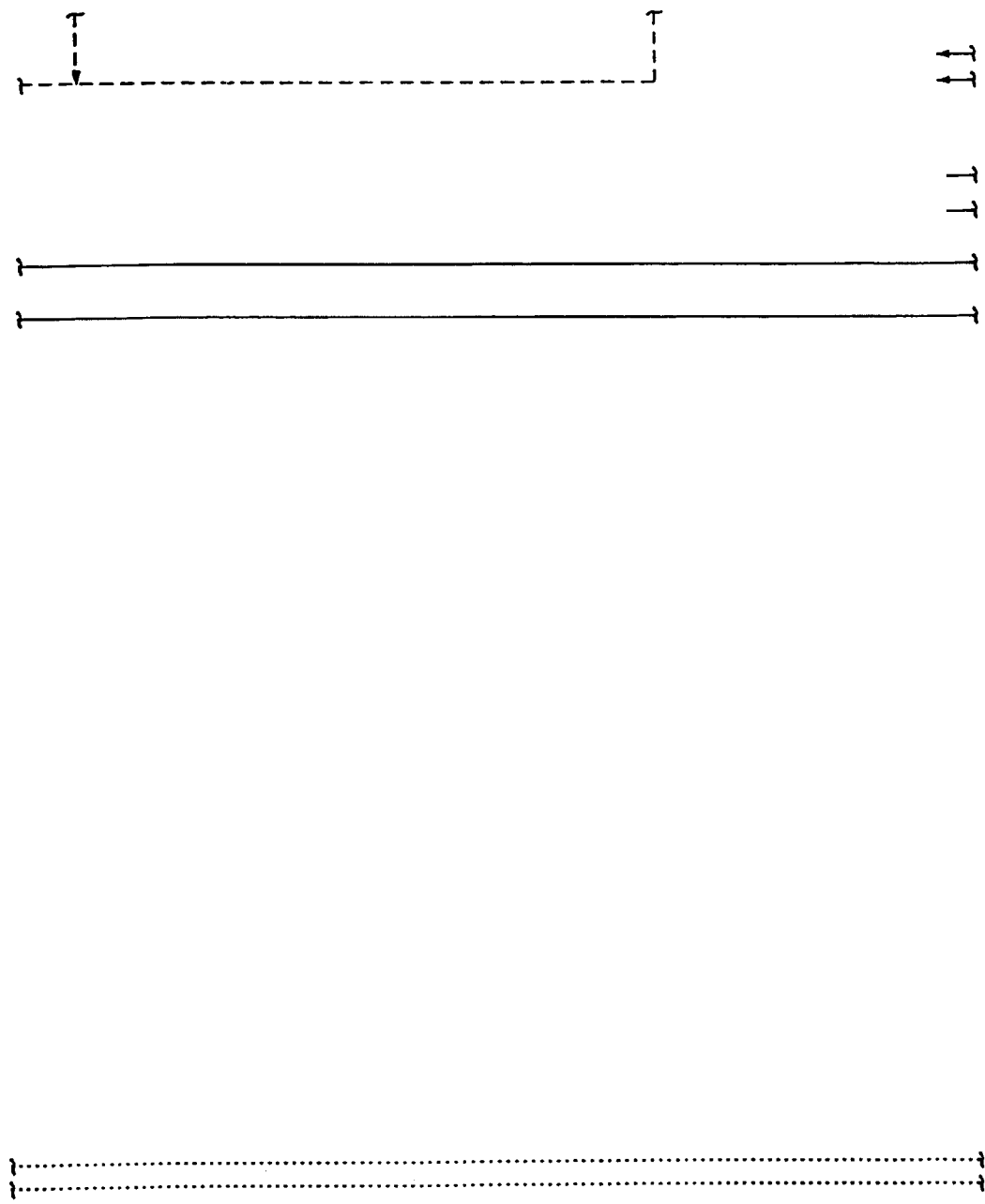
Figure 3H:
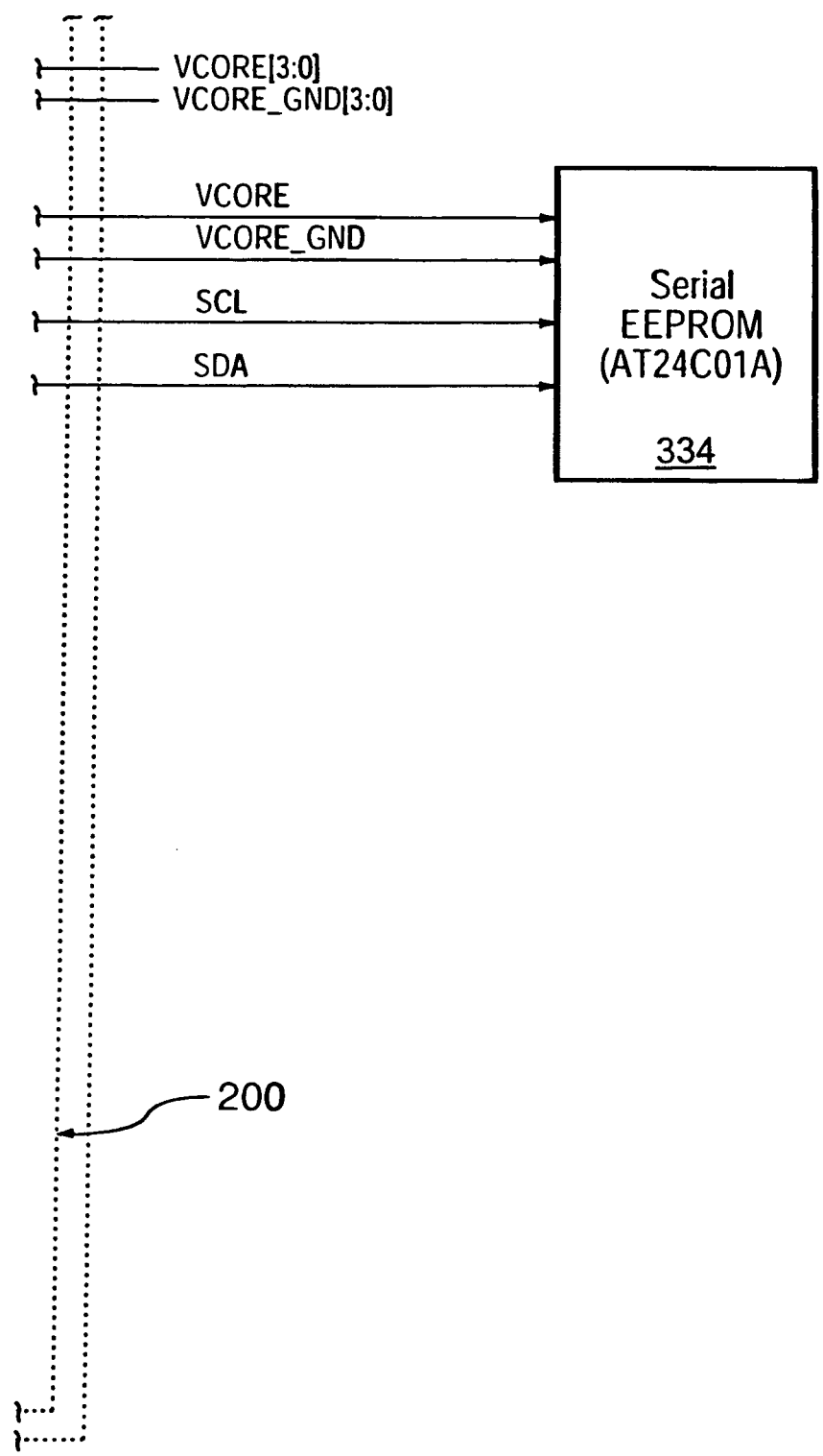
Figure 3I:
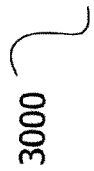
FIG. 3I illustrates the arrangement of FIGS. 3A through 3H.

The system will be described in detail below, by way of example only, in the context of a hand-held data processing device having wireless communications capabilities as illustrated in FIGS. 1 to 3. However, it will be appreciated that the principles apply to other data processing devices and the system is not intended to be limited thereby.

The present system provides an on-chip encryption system in which the encryption key is hardware-based. The hardware-based encryption system encrypts and decrypts that data in real time, without markedly reducing the operating speed of the device or markedly increasing energy consumption.

In the system, the data is encrypted using a hardware implementation of any suitable encryption algorithm, for example Advanced Encryption Standard (AES). In the preferred embodiment an initial encryption key is selected randomly and embedded at the time of manufacture of the chip, and preferably even the manufacturer does not retain any record of the randomly-selected initial encryption key. If the encryption key is to be changed after manufacture, all of the encrypted data must be read out of memory, decrypted using the key existing at the time of encryption, re-encrypted with the new key, and written back into memory. As the encryption key is changed, the components of the prior key(s) accumulate and form part of the new key together with an existing password and a seed value.

Figure 21:
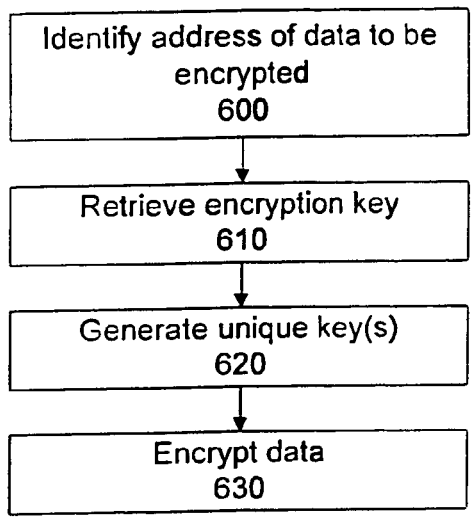
FIG. 21 is a flowchart of an embodiment of an encryption method carried out by the system.

To further increase security, in the preferred embodiment the encryption algorithm uses the address location of the data, so that the same data will be encrypted differently in successive encryption cycles because the location of the data in memory will typically differ from the previous location in which it had been stored. In the preferred embodiment, bits of the data sector address are exclusive-or'ed with the encryption/decryption key(s) to generate unique key(s). Since the encryption key is typically longer than the data sector address, not all the bits in the unique key thus generated will be distinct from the bits in the original encryption key; regardless, in the preferred embodiment, the keys thus generated will still be unique and specific to the location of the data to be encrypted. In this manner, a unique key is used for identical pieces of data stored in different memory locations. The encryption algorithm generates the necessary unique keys on the fly. As shown in FIG. 21, the encryption algorithm identifies the address of the data to be encrypted at step 600; retrieves the encryption key 610; generates the unique key(s) 620; and then encrypts the blocks of data at step 630.

In the preferred embodiment the encryption system performs a password verification before any data from memory can be decrypted. Also, in the preferred embodiment the encryption key is not derived from the password, so even a weak password will not compromise the key, and before any data from memory can be decrypted a security controller performs a password verification. It is possible to change the value of the key at anytime by transitioning through a state machine that requires successful entry of the password, and once the key is changed, all of the existing data that is encrypted with the old key must be read out using the old key and re-written using the new key.

Preferably the system will store up to four independent keys in non-volatile memory. The software may chose to use one or more of the extra key slots for redundant storage of a master key. The extra keys could also be used for different encryption purposes; for example, email could be encrypted with one key while a second key can be used to encrypt third party JAVA applications.

The use of a hardware-based encryption engine gives the manufacturer of the chip complete control over the encryption key that is inaccessible to software, even in debugging modes. This significantly reduces opportunities for attack. It also accelerates the encryption process and uses less energy than software-based systems.

These and other advantages of the system will become apparent from the description which follows.

The hand-held mobile communication devices 10 include a housing, a keyboard 14 and an output device 16. The output device shown is a display 16, which is preferably a full graphic LCD. Other types of input devices and output devices may alternatively be utilized. A processor 18, which is shown schematically in FIG. 1, is contained within the housing and is coupled between the keyboard 14 and the display 16. The processor 18 controls the operation of the display 16, as well as the overall operation of the mobile device 10, in response to actuation of keys on the keyboard 14 by the user.

The housing may be elongated vertically, or may take on other sizes and shapes (including clamshell housing structures). The keyboard may include a mode selection key, or other hardware or software for switching between text entry and telephony entry.

In addition to the processor 18, other parts of the mobile device 10 are shown schematically in FIG. 1. These include a communications subsystem 100; a short-range communications subsystem; the keyboard 14 and the display 16, along with other input/output devices 106, 108, 110 and 112; as well as memory devices 116, 118 and various other device subsystems 120. The mobile device 10 is preferably a two-way RF communication device having voice and data communication capabilities. In addition, the mobile device 10 preferably has the capability to communicate with other computer systems via the Internet.

Operating system software executed by the processor 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (RAM), in this embodiment SDRAM 118. Communication signals received by the mobile device may also be stored to the SDRAM 118. The persistent store thus comprises a computer usable medium for storing operating system software, data, or other program code.

The processor 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system.

Communication functions, including data and voice communications, are performed through the communication subsystem 100, and possibly through the short-range communications subsystem. The communication subsystem 100 includes a receiver 150, a transmitter 152, and one or more antennas 154 and 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile device 10 is intended to operate. For example, a mobile device 10 may include a communication subsystem 100 designed to operate with the Mobitex™, Data TACT™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Globile System for Mobile Communications (GSM), etc. Other types of data and voice networks, both separate and integrated, may also be utilized with the mobile device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processor 18. The received signal is then further processed by the processor 18 for an output to the display 16, or alternatively to some other auxiliary I/O device 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem enables communication between the mobile device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

FIG. 3, comprising FIGS. 3A through 3I, is a detailed block diagram of an embodiment of a memory controller interface 200 in the data processing device of FIG. 2. As would be understood by the person skilled in the art, FIGS. 3A through 3H represent portions of the memory controller interface 200 and may be arranged in the manner indicated in the grid 3000 of FIG. 3I, which indicates the relative placement of each of FIGS. 3A through 3H with textual labels. A power module 190 and a phase locked loop filter 220 interface with the system control module 216. A test controller 225 interfaces with a test control module 310 using a JTAG interface. The host processor 18 signals are managed by a microprocessor controller unit (MCU) interface control module 304. An interrupt generator 306 provides notice to the host processor 18 that the memory controller interface 200 has data, status, and/or instructions to send. An 10 pad control module 308 permits pull down, pull up, or other test operations on the 10 signals. The memory controller interface 200 is implemented with a flash memory interface controller, in this embodiment a NAND flash interface controller (NIC) 214, in communication with the flash memory; a memory interface controller for the ram, in this embodiment a SDRAM interface controller 300; and possibly other memory control interfaces, such as an auxiliary interface controller 328.

An interface 322 for a serial memory, such as a serial electrical programmable read only memory 334, may be provided for managing encryption keys for the memory interface controller 200. As noted above, preferably multiple keys may be stored in non-volatile memory, such as EEPROM. Also preferably, the encryption algorithm is implemented in hardware, and the keys cannot be read by software. In this embodiment, the serial memory interface 322 is a serial EEPROM controller. A state diagram and a configuration register map for the preferred embodiment of the serial EEPROM controller 322 is provided in FIGS. 14 and 15. A control register table and a status register table for the serial EEPROM controller 332 is shown in FIGS. 16A/B and FIGS. 17A/B, respectively. A detailed block diagram of an embodiment of the controller 322 is provided in FIG. 13. Referring to the block diagram, a key manager state machine 450 receives commands from the memory controller interface 200. The controller further comprises a password compare block 460 for authenticating supplied passwords, and XOR blocks 452 and 454 for generating new keys; a first XOR block 452 receives a key seed value and XORs this value with a current key value, then XORs the result with the current password to produce a new key. The new key is written as shown in block 464, and the controller 332 further comprises a key compare block 461 for verifying the written key.

Other components within the memory controller interface 200 usually include a cache control manager 210, a read/write buffer 212, an encryption block 316, an error correction coding module 324, and an error correction coding read buffer 326. The encryption block 316 is disposed upstream or downstream between the microprocessor controller unit 304 and the NIC 214. A configuration register map for an embodiment of the encryption block 316 is shown in FIG. 5.

The system relates to an encryption system for data processing devices such as the hand-held mobile communication device of FIG. 1. The encryption module, illustrated in FIG. 4, encrypts and decrypts in two different modes: peripheral mode and datapath mode. Peripheral mode allows a programmer to access the encryption module through a peripheral interface, while datapath mode incorporates the encryption module in the chain of functions that bridge SDRAM 118 with NAND 116. The datapath mode happens automatically due to a request from an upstream or downstream block. A peripheral encryption module operation cannot be interrupted by a datapath operation and vice versa. This means that a peripheral operation can be held off by a datapath operation, so a status register is provided for polling.

Preferably, while in datapath mode it is possible to bypass the encryption module 316 such that what comes out is what went in. There are two datapath keys supplied, along with bypass and select signals. The high level management of the keys is done in the serial memory interface block 322. The encryption module 316 accommodates such modes as debug and datacopy. The encryption module 316 functions as a peripheral, which can be loaded with a key and plaintext, and then launched. AES plaintext, AES ciphertext, key peripheral, manual, status, and control register tables for use with the preferred embodiment are shown in FIGS. 6 through 11. Once the status declares the operation is done, the result can be read from the cipher register. A launch can be done automatically or manually. In the automatic case, the encryption module 316 launches once a specific data register is written, and this register can be selected in anticipation of a big or little endian processor.

Under datapath operation there are two keys to choose from when not in bypass: the current key and a new key. Although encryption and decryption can be done with either key, in practical terms decryption will always be done with the current key. Encryption will normally be done with the current key but would be done with the new key during datacopy when the user wants to change over to a new key.

Communication is through a request and acknowledge protocol. The receiver sends a request for data, along with the address of a sector. The server acknowledges the request and provides data. Both the Ack and Req can be pulled low to stall the flow. The receiver asserts a sector frame signal until it has received all the data.

Preferably, requests to the encryption module 316 will always be a perfect multiple of the encryption module packet size of 128 bits. Preferably, it will be one NAND sector, which is 512 bytes. Requests from the encryption module 316 will always be in the encryption module packet size.

Figure 4:
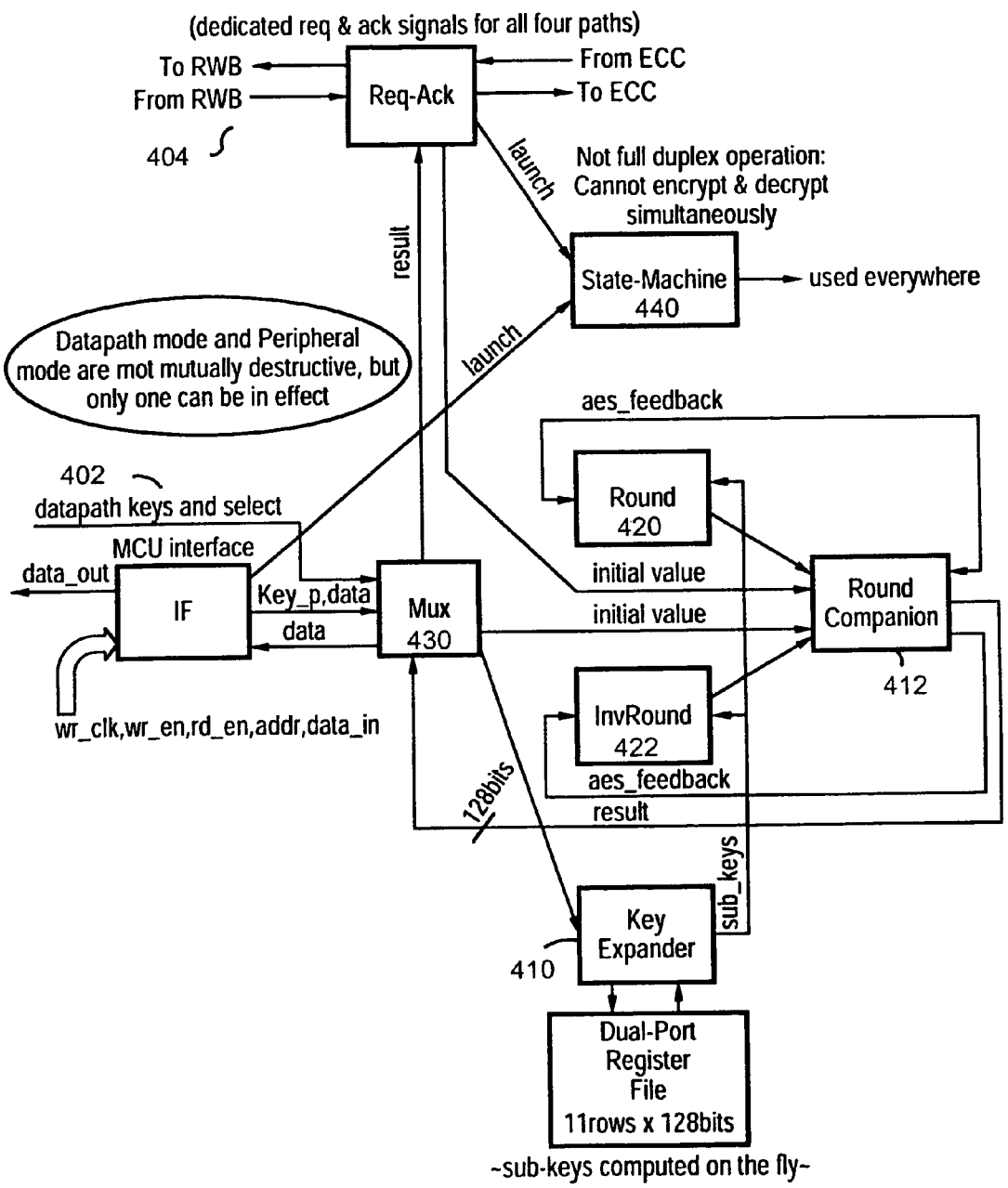
FIG. 4 is a detailed block diagram of an AES encryption module in the data processing device of FIG. 2.

FIG. 4 illustrates the two different interfaces to the block, as well as the implementation of the encryption module 316 encryption and decryption algorithms in hardware. The main areas are the peripheral 402 and datapath 404 interfaces, key expander 410, and individual encryption and decryption blocks. The peripheral bus preferably uses a dedicated write clock, which saves power over a scheme that simply qualifies the high speed system clock. The dedicated read enable signal, and read data bus allow a simple OR of all the peripheral data return buses since they return zero when not selected.

The encryption module clock enable is set when a datapath request is in force or a peripheral operation is pending and held until the encryption module state machine 440 has found its way back to idle. The other clock-gating domain lies with the datapath request-acknowledge handshake scheme. The acknowledge can be used to either gate the clock to a register, or qualify that clock. Whoever is sending data in response to an acknowledge has this choice. In the encryption module design the clock is qualified.

The datapath keys are supplied and managed from the serial memory interface block 322. The encryption module block 316 is flanked on two sides by the read/write buffer (RWB) 212 and the error correction coding module. It follows that there must be input and output data buses to each of these blocks, along with the handshaking signals. Dataflow can be stalled by either Ack or Req going low, so to know that a datapath operation is incomplete, a sector frame signal is used to bracket the entire transaction. The sector address consists of address bit 9 and upwards. A four bit address runs in the opposite direction and is used to select a buffer bank within the RWB 212. The architecture consists of dedicated combinational logic for a round of encryption and a round of decryption. Their contents are similar in size and function, but they are inverses. A round_companion module 412 accepts plaintext input and works with either Round 420 or InvRound 422 iteratively to produce a result, which is latched in the multiplexer block 430 and is accessible in either peripheral or datapath mode.

Preferably, if both datapath and peripheral mode requests were to arrive simultaneously, the datapath request has priority. This is unlikely, and in general, whatever operation is ongoing is allowed to finish. A peripheral operation is short while a datapath operation consists of 32 encryption module implementations. If one type of operation is requested while another is in progress, the request is queued. The queuing realistically assumes that a second operation of the same type will not or cannot be requested. It is possible that a peripheral mode operation will take just 11 or 23 clocks to complete, or be held off for one full datapath time, so pending, ongoing and completed status are provided. A datapath launch becomes pending when the 8th halfword arrives, while a peripheral launch becomes pending when the 8th halfword location is written.

Figure 12:
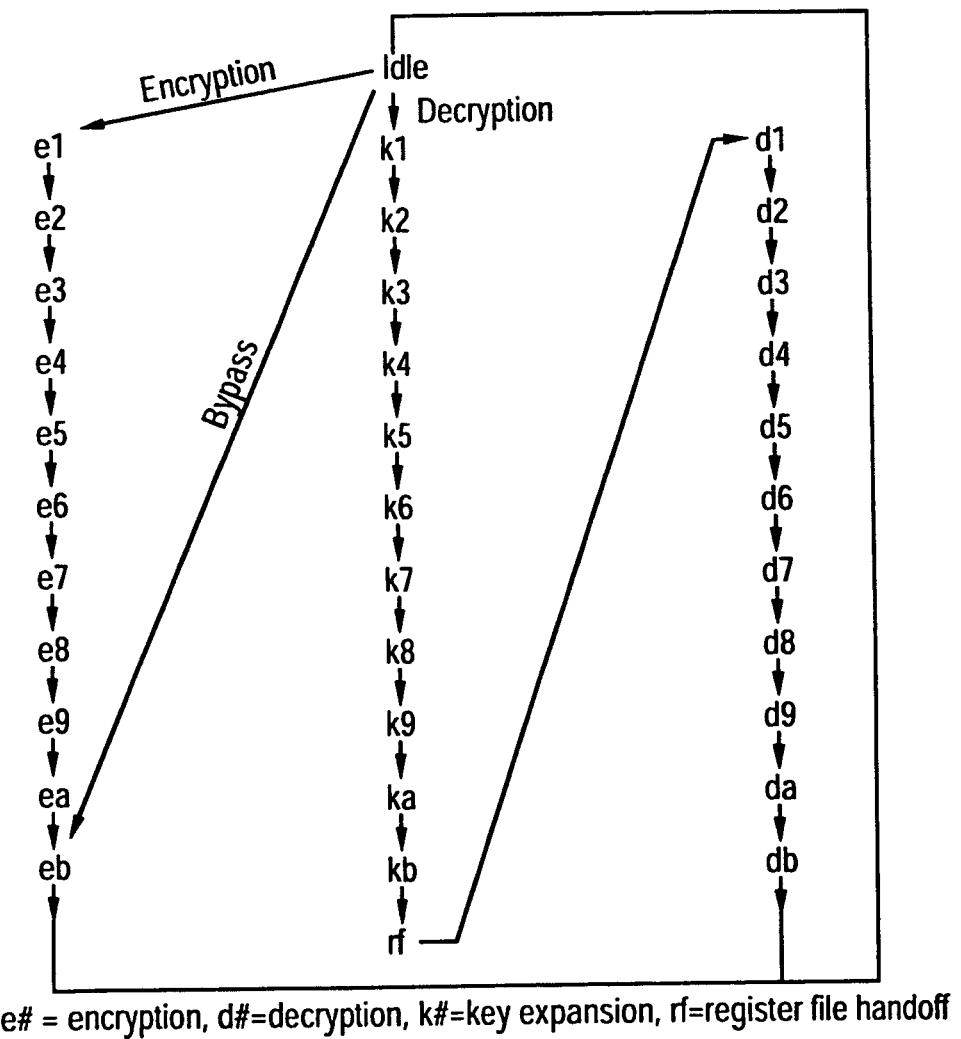
FIG. 12 is a State Diagram showing the encryption and decryption timing in the encryption module of FIG. 4.
Figure 22:
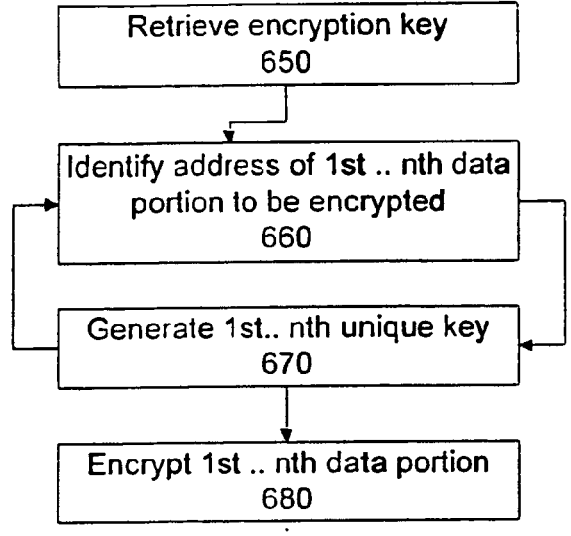
FIG. 22 is a flowchart of an embodiment of an encryption method carried out by the system.
Figure 23:
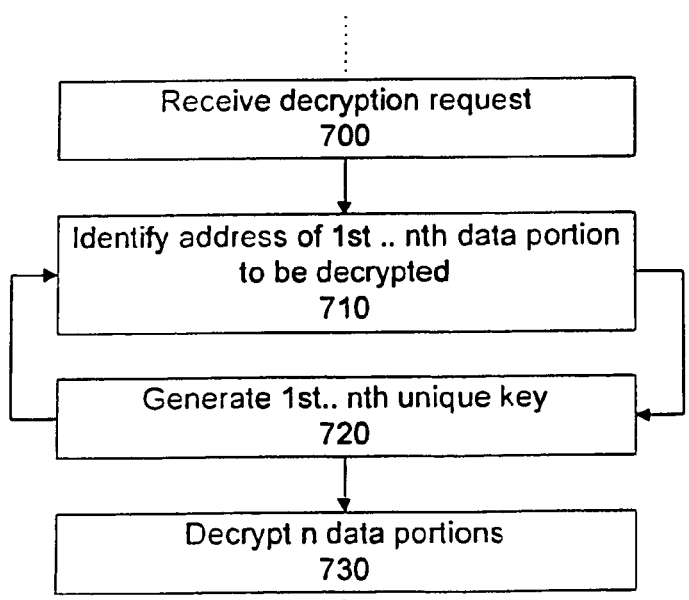
FIG. 23 is a flowchart of an embodiment of a decryption method carried out by the system.

As illustrated in FIG. 12, encryption of data to be written to NAND 116 takes 11 clocks while decryption takes 23 clocks. The discrepancy arises because the key is expanded to 11 unique keys and the order in which they are generated matches the requirement for them during encryption, but is in the opposite order to the sequence needed for decryption. This means they must be pre-expanded into a dual-port register file, taking 11 clocks. The register file's output is clocked so there is a clock cycle handoff time between the end of writing and the start of reading. Total decryption time is 11 clocks for expansion plus 1 clock handoff, and finally 11 clocks for actual decryption. Thus, referring to FIG. 22, preferably encryption by the encryption module 316 first retrieves the encryption key 650; identifies the 1st through nth sectors of data to be encrypted 660, then generates the 1st through nth unique keys based on the location of the data sectors, then encrypts the n data sectors using the n unique keys. When the same data is to be decrypted, as shown in FIG. 23, once a decryption request is received 700, the address of each of the sectors to be decrypted is identified 710, and the 1st though nth unique keys to be used for decryption are generated as above based on the location of the data sectors 720 before decrypting the n data sectors 730. Most preferably, the step of generating the unique key 720 includes the step of expanding the unique keys to a dual-port register file, or otherwise reordering the unique keys to the order needed to accomplish decryption.

PseudoCode for the Encryption Module Peripheral Mode is as follows:

```
define false = 0x0;
define Manual = 0b1; // Manual ENCRYPTION MODULE launch
define Auto = 0b0; // Auto ENCRYPTION MODULE launch
define le_not_be = 0b10; // If the processor splits a word write into two
    halfword writes, with le_not_be
// set the halfword write to the upper address (vs. lower address) will be
    the one
// that causes launch. Make your choice such that this is the last write.
define d_not_e = 0b100; // decryption.
define peri_enable = 0b1000; // Enable the clock while you use the
    ENCRYPTION MODULE or expect nothing.
define key = 0x000102030405060708090a0b0c0d0e0f;
define plain = 0x00112233445566778899aabbccddeeff;
define cipher = 0x69c4e0d86a7b0430d8cdb78070b4c55a;
// <>< Manual Launch ><>
Configure_encryption module_control_reg(Manual | le_not_be |
    d_not_e | peri_enable, ENCRYPTION MODULEbase+0x18);
Load_encryption module_plain_reg(cipher, ENCRYPTION
    MODULEbase+0x0); // ENCRYPTION MODULE input data
    (encryption or decryption) always goes in the
// plain register
Load_encryption module_key_reg(key, ENCRYPTION
    MODULEbase+0x10);
Launch_manual(ENCRYPTION MODULEbase+0x1a);
while (get_status(ENCRYPTION
    MODULEbase+0x19)&0x4)==false);
plain = retreive_cipher(ENCRYPTION MODULEbase+0x8);
// <>< Auto Launch ><>
Configure_encryption module_control_reg(Auto|
le_not_be | d_not_e |
    peri_enable, ENCRYPTION MODULEbase+0x18);
Load_encryption module_key_reg(key, ENCRYPTION
    MODULEbase+0x10);
Load_encryption module_plain_reg(cipher, ENCRYPTION
    MODULEbase+0x0); // eighth halfword write causes encryption
    module to launch.
while (get_status(ENCRYPTION
    MODULEbase+0x19)&0x4)==false);
plain = retreive_cipher(ENCRYPTION MODULEbase+0x8);
```

The datapath mode is more involved but has some simple governing rules. Communication is through a request and acknowledge protocol as shown in FIG. 4. The requesting block has a known amount of data to send, and the acknowledgement block 406 uses acknowledge to gate the sender's data and thus regulate the data flow.

Preferably, eight clocks are needed to assemble an encryption module packet before the encryption module 316 can proceed. It also takes eight clocks to send off the result. When a request to the encryption module 316 is received, the data is always read in without stalling, and the encryption module algorithm proceeds as far as it can before it would overwrite an old result, which has not yet been fully sent off. In short, any stalling is governed by the sending rather then the receiving. This simplifies the logic and allows the process to proceed as far as it possibly can before it needs to stall. If NAND Twc=70 ns minimum (14 Mhz) and the encryption module is run at 52 Mhz, the ratio is 1:4 if the word width is 16 bits. Thus, in this embodiment, the encryption module 316 should not present a bottleneck.

The user is able to access the serial EEPROM controller module 322 through the configuration bus interface, as shown in FIG. 2. The configuration bus is controllable from the MCU interface control 304, and from the JTAG interface. When the JTAG interface is used, the ENTER_DEBUG command is permitted, and changing of DIS_ENCRYPT in SEC_CTRL is prohibited.

Figure 13:
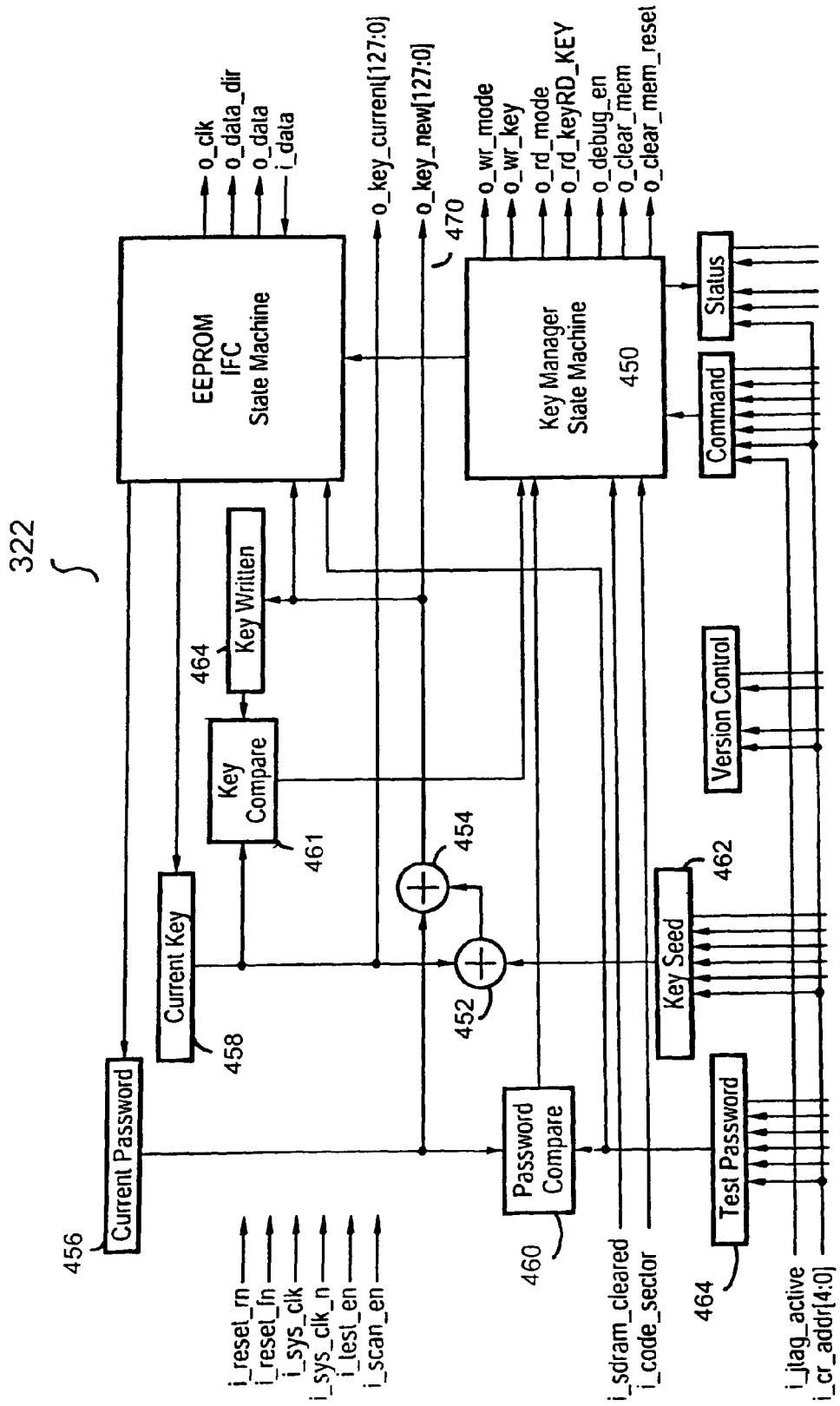
FIG. 13 is a block diagram of a Serial EEPROM Controller in the encryption module of FIG. 4.
Figure 14:
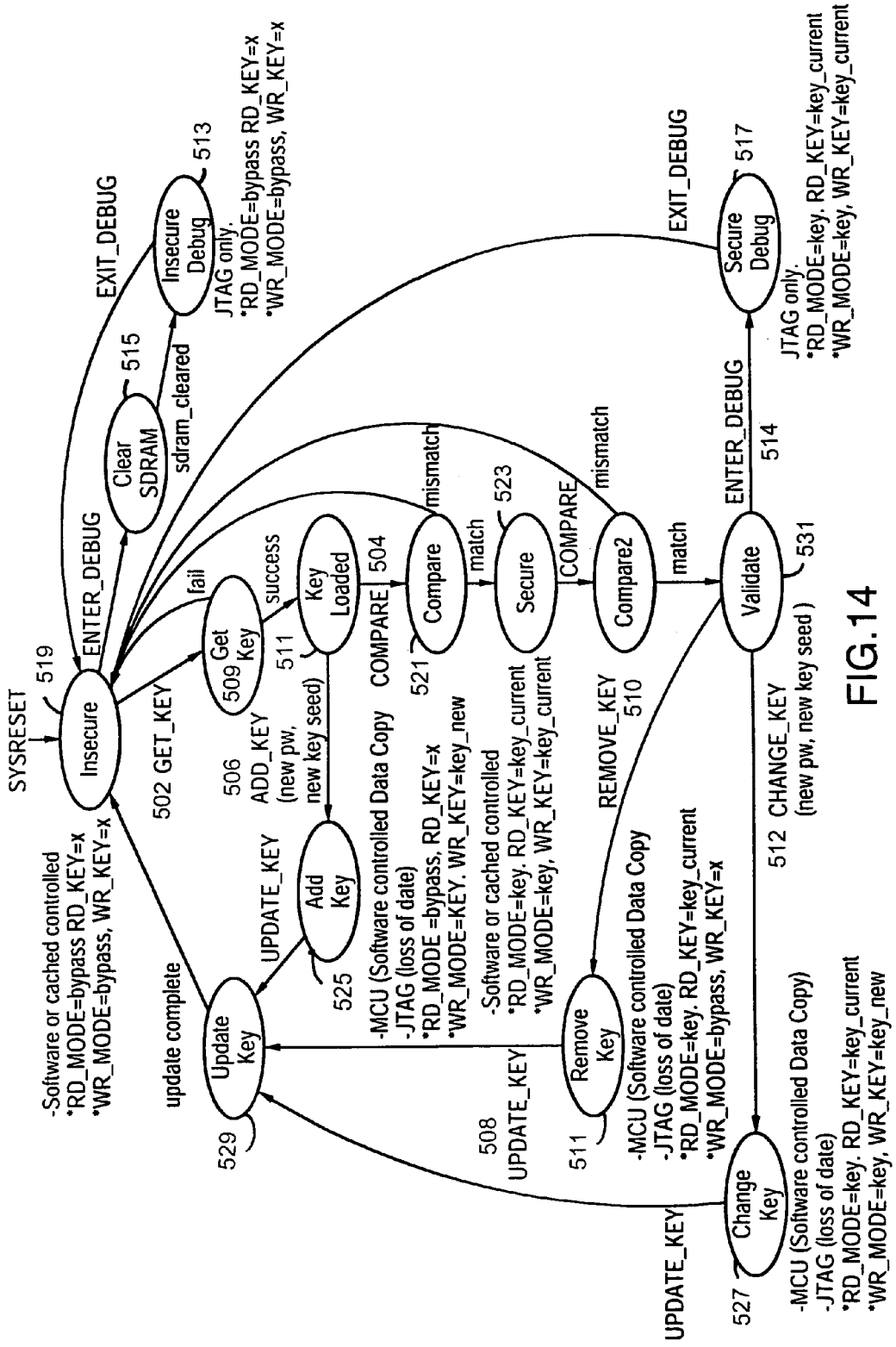
FIG. 14 is a state diagram for the Serial EEPROM Controller of FIG. 13.

Referring to FIGS. 13 and 14, in the preferred embodiment the serial EEPROM controller module 322 comprises a version control register, a password register, and a key seed register such as those set out in FIGS. 18, 19, and 20 for use in command execution. The following commands can be executed in the operation of the serial EEPROM controller module 322 described above, using the registers set out in FIG. 15.

The GET_KEY command 502 is issued when CMD[2:0]="000" is written to the SEC-CTRL register. This command retrieves the current key 458 and password 456 set from the EEPROM 334. The key and password set is determined by KEY_SELECT[1:0] found in the SEC-CTRL register.

The COMPARE_KEYS command 504 is issued when CMD[2:0]="001" is written to the SEC-CTRL register. This command provides the results of two comparisons. It compares the current password 456 with the test password 464 using the password compare block 460, and it compares the current key 458 with the previously written key 464 using the key compare block 461. The results are provided in the SEC-STATUS register.

The ADD_KEY command 506 is issued when CMD[2:0]="010" is written to the SEC-CTRL register. This command forms the new key 470 from the current password 456, current key 458, and the software supplied key seed 462. This new key 470 can be used in the datacopy operations. A new password is also supplied by software and will come into effect when the UPDATE command is executed. The current key 458 and current password 456 are retrieved with the GET_KEY command.

The REMOVE_KEY command 510 is issued when CMD[2:0]="011" is written to the SEC-CTRL register. This command transitions to the Remove key state where the datacopy can be completed.

The CHANGE_KEY command 512 is issued when CMD[2:0]="100" is written to the SEC-CTRL register. This command forms the new key 470 from the current password 456, current key 458, and a software supplied key seed 462. This new key can be used in the datacopy operations. A new password is also supplied by software and will come into effect when the UPDATE command is executed. The current key 458 and current password 456 are retrieved with the GET_KEY command. Reading the SEC_STATUS register provides the current key state status.

The UPDATE_KEY command 508 is issued when CMD[2:0]="101" is written to the SEC-CTRL register. The generated key 470 and new password are written into EEPROM 334 at the KEY_SELECT location.

The ENTER_DEBUG command 514 is issued when CMD[2:0]="110" is written to the SEC-CTRL register. This command must be executes from the JTAG interface. It transitions control to either the Insecure Debug state (through Clear SDRAM) or to the Secure Debug state. The ENTER_DEBUG command is issued when CMD[2:0]="111" is written to the SEC-CTRL register. This command transitions control to the Insecure state.

The following states are possible in the operation of the serial EEPROM controller 322 described above, with reference to the state diagram of FIG. 14:

Insecure 519: The device 10 is powered up in the Insecure state. In this state, a password is not required, and a key is not used to read and write data to NAND flash 116.

Clear SDRAM 515: This state asserts the CLEAR_SDRAM signal for the SDRAM interface controller 300. Transfer to the Insecure Debug state 513 will be completed upon receiving the SDRAM_CLEAR signal from the SDRAM interface controller 300. Clearing the SDRAM 118 prohibits the use of JTAG to read the contents of the SDRAM 118 in Debug mode.

Insecure Debug 513: This state asserts the DEBUG_EN signal, allowing the memory interface controller 200's debug functions with the encryption module 316 in bypass mode. Executing the EXIT_DEBUG command will transition control to the Insecure state 500.

Get Key 509: This state is entered with the Get_Key command 502. The password and key set is read from the EEPROM 334. If successful, the current key and current password are updated and control is transferred to the Key Loaded state 508. Control will be transferred back to the Insecure state 519 if the EEPROM 334 is busy writing, or if an error is encountered.

Key Loaded 511: This state is entered upon the successful read of the key and password from the EEPROM 334. A key comparison can be made by loading the compare keys commands, or a new key can be created by loading the add key command.

Compare 521: In this state, the current password is compared with the test password, and the current key is compared with the key written. Results are available upon completion. If the passwords match, control will be transferred to the Secure state 512. If the passwords did not match, control will be transferred back to the Insecure state 500.

Add Key 525: In this state, software can read in unencrypted data and write back using the newly generated encryption key. Since reading is done in bypass mode, all previously stored encrypted data is lost. Once the data copy operation is complete, the UPDATE_KEY command 508 is used to write the new key and password to the EEPROM 334. The Insecure state 519 is entered on completion.

Remove Key 511: The REMOVE_KEY command allows software to read encrypted data with the current key, and to write data back with no key. Once the data transfer is complete, the UPDATE_KEY command 508 is executed to write the new key into EEPROM 334.

Change Key 527: The CHANGE_KEY command allows software to read encrypted data with the current key, and to write data back with the new key. Once the data transfer is complete, the UPDATE_KEY command 508 is executed to write the new key into EEPROM 334.

Update Key 529: This state is entered with the Update command 508. The new password and newly form key are written to the EEPROM 334. On completion, control is transferred to the Insecure state 519.

Secure 523: In the Secure state, encrypted data is written to and read from NAND flash using the current key. In this mode, the COMPARE command must be executed. If the passwords match, the Validate state will 531 be entered. If the passwords do not match, the Insecure state 519 is entered.

Compare2: This state is entered from the Secure state 523. In this state, the current password is compared with the test password, and the current key is compared with the key written. Results are available upon completion. If the passwords match, control will be transferred to the Validate state 531. If the passwords did not match, control will be transferred back to the Insecure state 519.

Validate 531: This state ensures that a valid password is present prior to allowing the change of a key, the removal of a key, or the debugging with keys.

Secure Debug 517: This state asserts the DEBUG_EN signal, allowing the memory controller interface's debug functions with the encryption module 316 operational. Executing the EXIT_DEBUG command will transition control to the Insecure state 519.

Preferably the software supplied key seed 462, which is used in generating a new key 470, is created using a randomizing function, a random seed, or using data gathered from random sources, such as key hits. In the preferred embodiment, the new key 470 thus generated from the key seed 462, current password 456, and current key 458, is a bitwise XOR of the current key and key seed (via XOR 452) and of the current password (via XOR 454). Thus, the initially unknown encryption key embedded during manufacturing, as well as the initial password used to secure the device, is used to derive all future encryption keys, without any need for the user or manufacturer to know the value of the initial encryption key. If passwords for the communication device are set by the user rather than by software, it does not matter if a user chooses a weak password. The use of the key seed 462 and the current key 458 ensure that the newly generated encryption key is sufficiently strong, and not determinable from a user-chosen password. Further, new keys can be formulated by modifying the key seed. Bits can be inverted by seeding a bit position with a logic 1. At no time is the actual key known by software; only the comparison results from the compare block 461. Once the encryption key has been changed using the CHANGE_KEY command 512, the data encrypted using the previous ("current")

EEPROM testing is accommodated with the use of the current key, the key written, and the key compare block. A key can be generated and written into the EEPROM 334. This key can be read out and compared with the key written using the COMPARE command and monitoring using the KEY_STATUS[1:0] found in the SEC-STATUS register.

Various embodiments of the system having been thus described in detail by way of example, it will be apparent to those skilled in the art that variations and modifications may be made without departing from the invention.

We claim:

1. A data processing device, comprising:
at least one memory device storing encrypted data; and
at least one processor in communication with the at least one memory device, the at least one processor being configured to:
  decrypt the encrypted data using a first encryption key, the first encryption key being calculated using a current key and a memory address of the at least one memory device, the encrypted data being stored at the memory address of the at least one memory device;
  generate a new key from the current key, a stored password, and a key seed value;
  re-encrypt the data thus decrypted using a second encryption key, the second encryption key being calculated using the new key and a further memory address of the at least one memory device, the further memory address being a memory address where the re-encrypted data is to be stored;
  store the re-encrypted data in said at least one memory device at the location identified by the further memory address; and
  overwrite the current key with the new key.

2. The data processing device of claim 1, wherein the current key is derived from an inherently unknown value.

3. The data processing device of claim 2, wherein the new key is generated using a bitwise XOR of the current key, the stored password, and the key seed value.

4. The data processing device of claim 1, wherein the current key and the new key are stored in non-volatile memory of the data processing device inaccessible by software, and decrypting and re-encrypting is accomplished using a hardware implementation of a decryption and an encryption algorithm.

5. The data processing device of claim 1, wherein the at least one processor is configured to decrypt the encrypted data upon password verification.

6. The data processing device of claim 1, wherein the at least one memory device where the encrypted data is stored and the at least one memory device where the re-encrypted data is stored are the same.

7. The data processing device of claim 1, wherein:
the encrypted data is stored at a plurality of memory addresses of the at least one memory device;
the at least one processor is configured to decrypt the encrypted data by:
for each encrypted datum stored in a discrete memory location of the at least one memory device,
calculating the first encryption key by using the current key and a memory address corresponding to the discrete memory location, the first encryption key thus being different for each said datum; and
decrypting the datum using said first encryption key; and
the at least one processor is configured to re-encrypt the data thus decrypted by:
for each datum to be re-encrypted and stored in a further discrete memory location:
calculating the second encryption key using the new key and a memory address of the further discrete memory location, the second encryption key thus being different for each said datum; and
re-encrypting the datum thus decrypted with the second encryption key.

8. The data processing device of claim 1, wherein the memory address of the at least one memory device and the memory address where the re-encrypted data is to be stored are data sector addresses.

9. A method implemented in a data processing device comprising at least one memory device storing encrypted data, the method comprising:
decrypting the encrypted data using a first encryption key, the first encryption key being calculated using a current key and a memory address of the at least one memory device, the encrypted data being stored at the memory address of the at least one memory device;
generating a new key from the current key, a stored password, and a key seed value;
re-encrypting the data thus decrypted using a second encryption key, the second encryption key being calculated using the new key and a further memory address of the at least one memory device, the further memory address being a memory address where the re-encrypted data is to be stored;

storing the re-encrypted data in said at least one memory device at the location identified by the further memory address; and
overwriting the current key with the new key.

10. The method of claim 9, wherein the current key is derived from an inherently unknown value.

11. The method of claim 10, wherein the new key is generated using a bitwise XOR of the current key, the stored password, and the key seed value.

12. The method of claim 9, wherein the current key and the new key are stored in non-volatile memory of the data processing device inaccessible by software, and decrypting and re-encrypting is accomplished using a hardware implementation of a decryption and an encryption algorithm.

13. The method of claim 9, wherein the decrypting is carried out upon password verification.

14. The method of claim 9, wherein the at least one memory device where the encrypted data is stored and the at least one memory device where the re-encrypted data is stored are the same.

15. The method of claim 9, wherein:
the encrypted data is stored at a plurality of memory addresses of the at least one memory device;
decrypting the encrypted data comprises:
for each encrypted datum stored in a discrete memory location of the at least one memory device,
calculating the first encryption key by using the current key and a memory address corresponding to the discrete memory location, the first encryption key thus being different for each said datum; and
decrypting the datum using said first encryption key; and
re-encrypting the data thus decrypted comprises:
for each datum to be re-encrypted and stored in a further discrete memory location:
calculating the second encryption key using the new key and a memory address of the further discrete memory location, the second encryption key thus being different for each said datum; and
re-encrypting the datum thus decrypted with the second encryption key.

16. The method of claim 9, wherein the memory address of the at least one memory device and the memory address where the re-encrypted data is to be stored are data sector addresses.

* * * * *